(12) United States Patent
Sun et al.

(10) Patent No.: US 10,560,755 B2
(45) Date of Patent: Feb. 11, 2020

(54) METHODS AND SYSTEMS FOR CONCURRENTLY TRANSMITTING OBJECT DATA BY WAY OF PARALLEL NETWORK INTERFACES

(71) Applicant: Verizon Patent and Licensing Inc., Arlington, VA (US)

(72) Inventors: Dan Sun, Bridgewater, NJ (US); Syed Kamal, Raritan, NJ (US); Lama Hewage Ravi Prathapa Chandrasiri, Princeton Junction, NJ (US); Mohammad Raheel Khalid, Budd Lake, NJ (US); Christian Egeler, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/274,066

(22) Filed: Sep. 23, 2016

(65) Prior Publication Data

US 2018/0091866 A1 Mar. 29, 2018

(51) Int. Cl.
| | |
|---|---|
| *H04N 19/119* | (2014.01) |
| *H04N 5/77* | (2006.01) |
| *H04N 21/63* | (2011.01) |
| *H04N 21/61* | (2011.01) |
| *H04N 21/647* | (2011.01) |
| *H04N 21/2662* | (2011.01) |
| *H04N 11/02* | (2006.01) |

(52) U.S. Cl.
CPC .......... *H04N 21/631* (2013.01); *H04N 21/61* (2013.01); *H04N 21/64784* (2013.01)

(58) Field of Classification Search
None
See application file for complete search history.

(56) References Cited

U.S. PATENT DOCUMENTS

| | | | | |
|---|---|---|---|---|
| 5,920,545 A | * | 7/1999 | Rasanen | H04L 1/1819 370/229 |
| 6,122,020 A | * | 9/2000 | Abe | H04N 21/234 348/721 |
| 6,308,082 B1 | * | 10/2001 | Kronestedt | H04L 1/0003 370/335 |
| 6,389,066 B1 | * | 5/2002 | Ejzak | H04L 1/0007 370/252 |
| 6,421,541 B1 | * | 7/2002 | Karlsson | H04L 1/0025 370/437 |

(Continued)

*Primary Examiner* — Nasser M Goodarzi
*Assistant Examiner* — Terrika Peterson

(57) ABSTRACT

A first communication device communicatively coupled with a second communication device by way of a first network interface and by way of a second network interface parallel to the first network interface prepares object data in accordance with a data partitioning protocol for transmission to the second communication device. The first communication device transmits the prepared object data to the second communication device at an overall data transfer rate that is at least as great as a sum of first and second data transfer rates associated, respectively, with the first and second network interfaces by concurrently transmitting first and second portions of the prepared object data by way of the first and second network interfaces and at the first and second data transfer rates, respectively. Corresponding methods and devices for receiving concurrently transmitted object data by way of parallel network interfaces are also disclosed.

20 Claims, 16 Drawing Sheets

(56) References Cited

U.S. PATENT DOCUMENTS

| | | | | |
|---|---|---|---|---|
| 6,804,253 | B2* | 10/2004 | Western | H04L 1/0025 370/465 |
| 7,489,631 | B2* | 2/2009 | Ilan | H04L 12/5602 370/230.1 |
| 8,443,100 | B1* | 5/2013 | Khan | H04W 40/02 709/232 |
| 9,003,157 | B1* | 4/2015 | Marshak | G06F 3/0685 711/170 |
| 9,176,955 | B2* | 11/2015 | Ganesan | G06F 17/30017 |
| 2002/0031104 | A1* | 3/2002 | Griffith | H04L 29/06 370/329 |
| 2004/0218099 | A1* | 11/2004 | Washington | H04N 5/77 348/571 |
| 2008/0298463 | A1* | 12/2008 | Stivers | G09G 5/003 375/240.21 |
| 2009/0021646 | A1* | 1/2009 | Shao | H04N 7/063 348/608 |
| 2009/0278985 | A1* | 11/2009 | Chan | G06F 3/1446 348/554 |
| 2014/0010289 | A1* | 1/2014 | Lukasik | H04N 19/119 375/240.08 |
| 2014/0211094 | A1* | 7/2014 | Minamoto | H04N 5/38 348/723 |
| 2015/0110469 | A1* | 4/2015 | Ushiyama | H04N 21/2662 386/241 |
| 2015/0358640 | A1* | 12/2015 | Hendry | H04N 19/547 375/240.13 |
| 2016/0164761 | A1* | 6/2016 | Sathyanarayana | H04L 65/60 709/219 |
| 2016/0203579 | A1* | 7/2016 | Griffin | G06F 3/1446 345/520 |
| 2017/0366515 | A1* | 12/2017 | Wood | H04L 63/0428 |
| 2018/0338125 | A1* | 11/2018 | Hyakudai | H04N 11/02 |

* cited by examiner

METHODS AND SYSTEMS FOR CONCURRENTLY TRANSMITTING OBJECT DATA BY WAY OF PARALLEL NETWORK INTERFACES

BACKGROUND INFORMATION

Various technologies and applications require transferring large amounts of data at relatively fast data transfer rates. For example, media content distribution technologies such as television broadcasting, on-demand media content distribution, etc., may rely on or benefit from transferring large amounts of data (e.g., high quality video data) in relatively short periods of time. Similarly, as another example, virtual reality technologies may also benefit from fast transfer of large amounts of video data and/or other types of object data. For real-time media content generation and distribution, fast data transfer rates may be particularly beneficial.

Unfortunately, in spite of continuing advances in data transfer technologies and the availability of increasingly high data transfer speeds, data transfer of data from one communication device to another continues to be a bottleneck in certain applications. Consequently, such applications may benefit from methods and systems for transferring large amounts of data more quickly. For example, by transferring more data in less time, an end user experience may be improved by allowing higher quality data to be presented to users in substantially real time.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
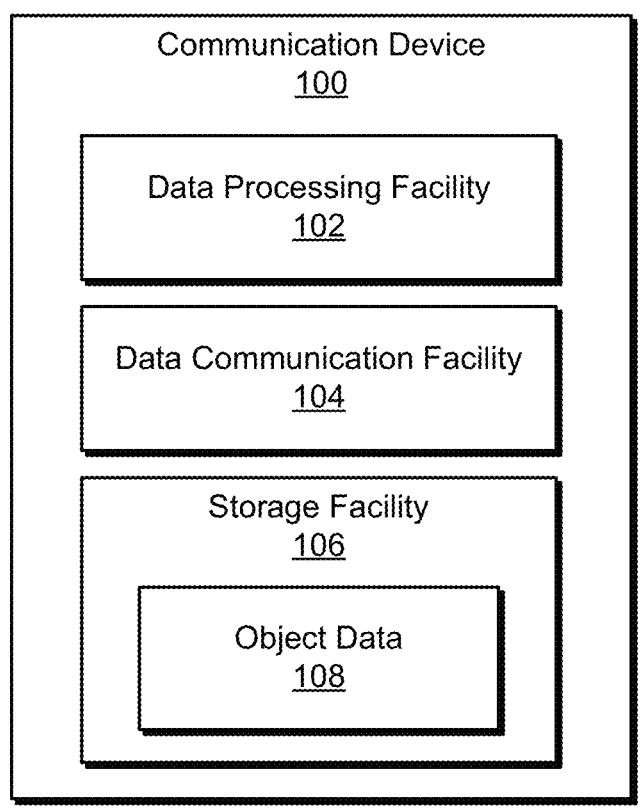
FIG. 1 illustrates exemplary components of an exemplary communication device that may be used for concurrently transmitting object data by way of parallel network interfaces according to principles described herein.

Methods and systems for concurrently transmitting object data by way of parallel network interfaces are described herein. As used herein, an "object" may refer to any physical or non-physical article, item, representation, phenomenon, entity, etc., or any collection of interrelated articles, items, representations, phenomena, entities, etc., for which data representing the collection may be captured, stored, transmitted, analyzed, and/or otherwise treated as a logical unit. For example, objects may include physical articles, real-world scenes comprising pluralities of physical articles, virtual articles, models or other representations of physical and/or virtual articles, audio or representations of audio associated with physical and/or virtual articles, statuses of physical and/or virtual articles or representations thereof, movements of physical and/or virtual articles or representations thereof, metadata or code related to physical and/or virtual articles, and the like.

As such, "object data," as used herein, may refer to a set of data that relates to (e.g., represents, describes, embodies, etc.) an object and may be transmitted by way of one or more network interfaces and networks as described herein. Because a particular instance of object data (e.g., a file, a stream, a collection of interrelated files or streams related to the same object, etc.) may relate to a single object, the instance of object data may be a logical unit of data. As such, it may be desirable to transmit the instance of the object data as a unit from one particular source to one particular destination. Thus, even if the object data is partitioned or otherwise divided and broken up during the communication process, it may be desirable for the entire instance of the object data to be transmitted to the same destination and to be recombined at the destination.

Various types of object data representative of various types of objects may be transmitted according to the principles described herein. For example, in certain implementations, object data may include video data (e.g., one or more video data files, one or more video data streams, etc.) received from one or more video capture units and that represent one or more physical articles (e.g., articles within a real-world scene being captured by the one or more video capture units). In the same or other examples, object data may include image data, three dimensional ("3D") texture data, 3D model data, audio data, point cloud data (e.g., sparse point cloud data), advertising data, camera data, movement data, and/or any other suitable data representing one or more physical or virtual articles or other objects as may serve a particular implementation. In certain examples, object data may also include data collections related to, for example, JSON and/or JavaScript-based metadata for construction of 3D immersive virtual reality worlds and/or avatars, hypertext transfer protocol ("HTTP") communication data or metadata related to the 3D immersive virtual reality worlds and/or avatars, synchronization data (e.g., over WebRTC data sockets) for virtual reality experiences and/or multi-use interactions, and the like. For clarity of description, several examples described herein may focus on object data that may be implemented by video data. However, it will be understood that principles described herein may equally apply to other types of object data (i.e., non-video object data), such that any type of object data may be concurrently transmitted by way of parallel network interfaces according to methods and systems disclosed and illustrated below.

In certain implementations, object data being transferred may relate to providing virtual reality experiences users. For example, large amounts of virtual reality object data may be transferred as part of the capture, generation, and/or distribution of virtual reality media content that may be used to provide immersive virtual reality worlds that users of media player devices capable of rendering the virtual reality media content may experience. In some examples, object data may be transferred in real time from one or more video capture units (e.g., video cameras) to servers configured to combine, process, and/or distribute the object data (e.g., by stitching discrete data streams into one 360° video stream and/or by otherwise preparing the object data to be presented as virtual reality media content).

As will be described and illustrated below, a first communication device may be communicatively coupled with a second communication device by way of a first network interface and by way of a second network interface parallel to the first network interface. The first communication device may access (e.g., receive, load up, generate, etc.) a large amount of object data (e.g., video data from one or more video capture units or other types of object data to be used in generating virtual reality media content) that is to be transmitted to the second communication device. As such, the first communication device may be any communication device capable of accessing and transmitting the object data as may serve a particular implementation. For example, as will be described in more detail below, the first communication device may be implemented by a mobile device (e.g., a smart phone, a tablet, etc.) associated with a user and capable of generating user content (e.g., using one or more video cameras built into the mobile device), a data upload device ("upload box") that receives data from one or more video capture devices (e.g., video cameras located in positions surrounding an event, 360-degree video cameras, individual segment capture cameras built into a 360-degree video camera, etc.), a server that loads the object data from a storage facility associated with the server, or the like.

The second communication device may be the same or a different type of communication device as the first communication device and may be implemented by any communication device capable of receiving the object data and combining the object data into a renderable object data aggregation. For example, as will be described in more detail below, the second communication device may be implemented by a server configured to combine the object data (e.g., a media backend server configured to "stitch" the object data into a video image or other type of object renderable by one or more media player devices), another mobile device (e.g., a smart phone, a tablet, etc.) associated with another user, or the like.

The first and second network interfaces by way of which the first and second communication devices are communicatively coupled may include any network interfaces that either the first or the second communication devices may use to transfer or receive data. For example, the first and second network interfaces may provide communicative access to networks such as cellular data networks (i.e., in the case of a cellular data network interface), wireless local area networks such as "WiFi networks" (i.e., in the case of a wireless network interface), wired local area networks (i.e., in the case of a wired network interface), and other suitable networks over which data may be transferred from one communication device to another. In some examples, the first and second network interfaces are of different types (e.g., the first network interface may be a cellular data network interface and the second network interface may be a wireless network interface (i.e., an interface to a wireless local area network such as a WiFi network)).

The first and the second network interfaces may be "parallel" to one another in the sense that the network interfaces may be separate from one another (e.g., using different electrical conductors, different bands within a wireless spectrum, different protocols, etc.) while ultimately serving to transfer data from a same starting point to a same destination (e.g., from the first communication device to the second communication device). Each of the first and second network interfaces may be associated with a respective data transfer rate at which the network interface is capable of transmitting data. For example, the data transfer rate associated with a network interface may be a maximum (e.g., a theoretical or actual maximum) rate at which the network interface is capable of transferring data, a nominal rate at which the network interface is capable of transferring data, an actual rate at which the network interface is capable of transferring data taking into account current network conditions (e.g., real-time network traffic, etc.), and/or any other rate at which the network interface is capable of transferring data. In some examples, data transfer rates associated with network interfaces may dynamically change (e.g., based on network conditions, network traffic, etc.).

Accordingly, in order to perform the concurrent transmission of the object data from the first communication device to the second communication device by way of the parallel first and second network interfaces, the first communication device may prepare the object data in accordance with a data partitioning protocol for transmission to the second communication device. For example, the data partitioning protocol may designate that a certain portion of the object data is to be transmitted by way of the first network interface while another portion of the object data is to be transmitted by way of the second network interface. In certain implementations, the first and second communication devices may be further communicatively coupled by one or more additional network interfaces parallel to the first and second network interfaces and the data partitioning protocol may further designate that one or more other portions of the object data is to be transmitted by way of the one or more additional network interfaces. Examples of data partitioning protocols will be provided below.

After preparing the object data in accordance with the data partitioning protocol, the first communication device may transmit the prepared object data to the second communication device at an overall data transfer rate that is at least as great as a sum of a first data transfer rate associated with the first network interface and a second data transfer rate associated with the second network interface. This may be performed by transmitting a first portion of the prepared object data (i.e., a first object data portion designated by the data partitioning protocol) by way of the first network interface at the first data transfer rate, and transmitting a second portion of the prepared object data (i.e., a second object data portion designated by the data partitioning protocol) by way of the second network interface at the second data transfer rate. In some examples, the second portion of the prepared object data transmitted by way of the second network interface may be transmitted concurrently with the transmission of the first portion of the prepared object data by way of the first network interface. Specific examples of transmitting prepared object data by the first communication device are described below.

The second communication device may receive the object data prepared and transmitted by the first communication device at the overall data transfer rate by receiving the first portion of the object data by way of the first network interface at the first data transfer rate and receiving the second portion of the object data by way of the second network interface at the second data transfer rate. For example, the second communication device may receive the second portion of the object data by way of the second network interface concurrently with the receiving of the first portion of the object data by way of the first network interface.

Upon receiving the first and second portions of the object data, the second communication device may identify the data partitioning protocol used by the first communication device to prepare the object data for transmission by way of the first network interface and the second network interface. For example, the second communication device may identify the data partitioning protocol to determine how the first portion of the object data received by way of the first network interface is related to the second portion of the object data received by way of the second network interface. Accordingly, the second communication device may combine the first portion of the object data and the second portion of the object data in accordance with the identified data partitioning protocol to generate a renderable object data aggregation in any way that may serve a particular implementation.

For example, the second communication device may combine the first and second portions of the object data to reverse the partitioning of the object data by the first communication device (i.e., restoring the form of the object data to the form prior to the preparation for transmission by the first communication device). Additionally or alternatively, the second communication device may further combine the object data into a new form that may be used by the second communication device or by other communication devices (e.g., virtual reality media player devices). For example, if the object data represents a plurality of separate video data instances all associated with one immersive virtual reality world, the second communication device may further combine the object data by stitching the separate video data instances together and/or performing additional processing to convert the object data into virtual reality media content that may be rendered by media player devices to which the virtual reality media content is transmitted. Specific examples of combining the object data to generate and/or provide the renderable object data aggregations by the second communication device are described below.

Several benefits may arise by concurrently transmitting object data by way of parallel network interfaces as described herein. For example, by concurrently transmitting the object data by way of the parallel network interfaces, an overall data transfer rate greater than the respective data transfer rates associated with either of the network interfaces alone may be achieved. As mentioned above, faster data transmission from one communication device to another may help remove or alleviate a bottleneck limiting certain technologies to thereby enable these technologies to develop and improve. For example, for a technology such as the real-time generation and distribution of virtual reality media content, faster data transfer of object data from video capture units to a stitching server where virtual reality media content is generated based on the object data may enable significant increases in the quality of virtual reality media content being provided (e.g., resolution, delay time, etc.) and thereby improve the virtual reality experiences of end users.

Along with these data transfer speed increases and resultant time saving benefits, cost savings may also be achieved when object data is transmitted concurrently by way of two parallel network interfaces according to methods and systems described herein. For example, one network may be significantly costlier to transmit data over than another network. By partitioning object data (e.g., preparing the data according to the data partitioning protocol) as described herein, a less expensive network may be relied on more heavily for object data transmission, while a more expensive network may be relied on more lightly (e.g., used in parallel only to an extent necessary to meet particular data transfer rate targets of a particular application).

Various embodiments will now be described in more detail with reference to the figures. The disclosed methods and systems may provide one or more of the benefits mentioned above and/or various additional and/or alternative benefits that will be made apparent herein. For example, along with benefits accruing to the real-time, virtual-reality-related technologies used in one or more of the examples herein, it will also be understood that similar and/or additional benefits and advantages may accrue to non-real-time applications and/or non-virtual-reality-related applications based on the teachings herein.

FIG. 1 illustrates exemplary components of an exemplary communication device 100 ("device 100") that may be used for concurrently transmitting object data by way of parallel network interfaces. For example, as will be described in more detail below, device 100 may be configured either to transmit the object data by way of the parallel network interfaces (e.g., to another communication device similar to or distinct from device 100), to receive the object data by way of the parallel network interfaces (e.g., from another communication device similar to or distinct from device 100), or both.

As shown in FIG. 1, device 100 may include, without limitation, a data processing facility 102, a data communication facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 will now be described in more detail.

In examples where device 100 is configured to concurrently transmit object data by way of parallel network interfaces, data processing facility 102 may receive, generate, load up, and/or otherwise access the object data in any way as may serve a particular implementation in order to prepare the object data for transmission to another communication device. For example, if device 100 is communicatively coupled to a source of object data such as one or more video capture units (e.g., video cameras), device 100 may receive object data from each of the one or more video capture units and further prepare (e.g., partition, etc.) the object data in accordance with a data partitioning protocol for transmission to the other communication device. Similarly, if device 100 includes object data (e.g., within storage facility 106) and/or is configured to generate object data (e.g., with one or more video capture units included within device 100, such as a built-in video camera on a mobile communication device such as a cell phone), device 100 may load up and/or generate the object data as part of the preparation of the object data prior to, for example, partitioning the object data in accordance with the data partitioning protocol for transmission to the other communication device.

Moreover, in examples where device 100 is configured to concurrently transmit object data by way of parallel network interfaces, data communication facility 104 may be configured to transmit the object data (e.g., as prepared by data processing facility 102) to the other communication device in any way that may serve a particular implementation. For example, data communication facility 104 may transmit the prepared object data at an overall data transfer rate that is at least as great as a sum of a first data transfer rate associated with a first network interface and a second data transfer rate associated with a second network interface by transmitting a first portion of the prepared object data by way of the first network interface at the first data transfer rate and transmitting a second portion of the prepared object data by way of the second network interface at the second data transfer rate concurrently with the transmission of the first portion of the prepared object data by way of the first network interface.

In the same or other examples, device 100 may be configured to receive transmissions of prepared object data (e.g., prepared according to the data partitioning protocol) in addition to or as an alternative to transmitting such prepared object data. For example, in implementations where device 100 is configured to receive concurrently transmitted object data by way of parallel network interfaces, data communication facility 104 may be configured to receive object data prepared and transmitted to device 100 by another communication device (e.g., similar to or different from device 100) at an overall data transfer rate at least as great as a sum of a first data transfer rate associated with the first network interface and a second data transfer rate associated with the second network interface. Specifically, data communication facility 104 may receive the object data at the overall data transfer rate by receiving a first portion of the object data by way of the first network interface at the first data transfer rate and receiving a second portion of the object data by way of the second network interface at the second data transfer rate concurrently with the receiving of the first portion of the object data by way of the first network interface.

In implementations where device 100 is configured to receive concurrently transmitted object data by way of parallel network interfaces, data processing facility 102 may identify a data partitioning protocol used to prepare the object data for transmission (e.g., by the other communication device transmitting the object data) and/or combine the first portion of the object data and the second portion of the object data into a renderable object data aggregation in accordance with the identified data partitioning protocol in any way as may serve a particular implementation. In some examples, data processing facility 102 may combine and/or otherwise process the object data so as to generate a renderable object data aggregation that may be transmitted (e.g., by data communication facility 104) back to the other communication device and/or to one or more additional communication devices. For example, data processing facility 102 may stitch together the object data (e.g., into a 360° image or video), process the object data to generate one or more volumetric models of objects represented within the object data, combine one or more objects together (e.g., adding virtual objects, audio, etc., into video or a volumetric model of a real-world scene), or perform any other processing on the object data as may serve a particular implementation. Once the object data is processed and the renderable object data aggregation is generated by data processing facility 102, the renderable object data aggregation may be sent to one or more additional communication devices (e.g., media player devices, end user devices, etc.) by data communication facility 104.

Storage facility 106 may maintain object data 108 and/or any other data received, generated, managed, maintained, used, and/or transmitted by facilities 102 or 104 in a particular implementation. Object data 108 may include raw object data, processed object data, aggregation data used to generate the renderable object data aggregation, renderable object data aggregations, metadata related to any of the above, and/or any other data as may be used by facilities 102 or 104 in a particular implementation.

Figure 2:
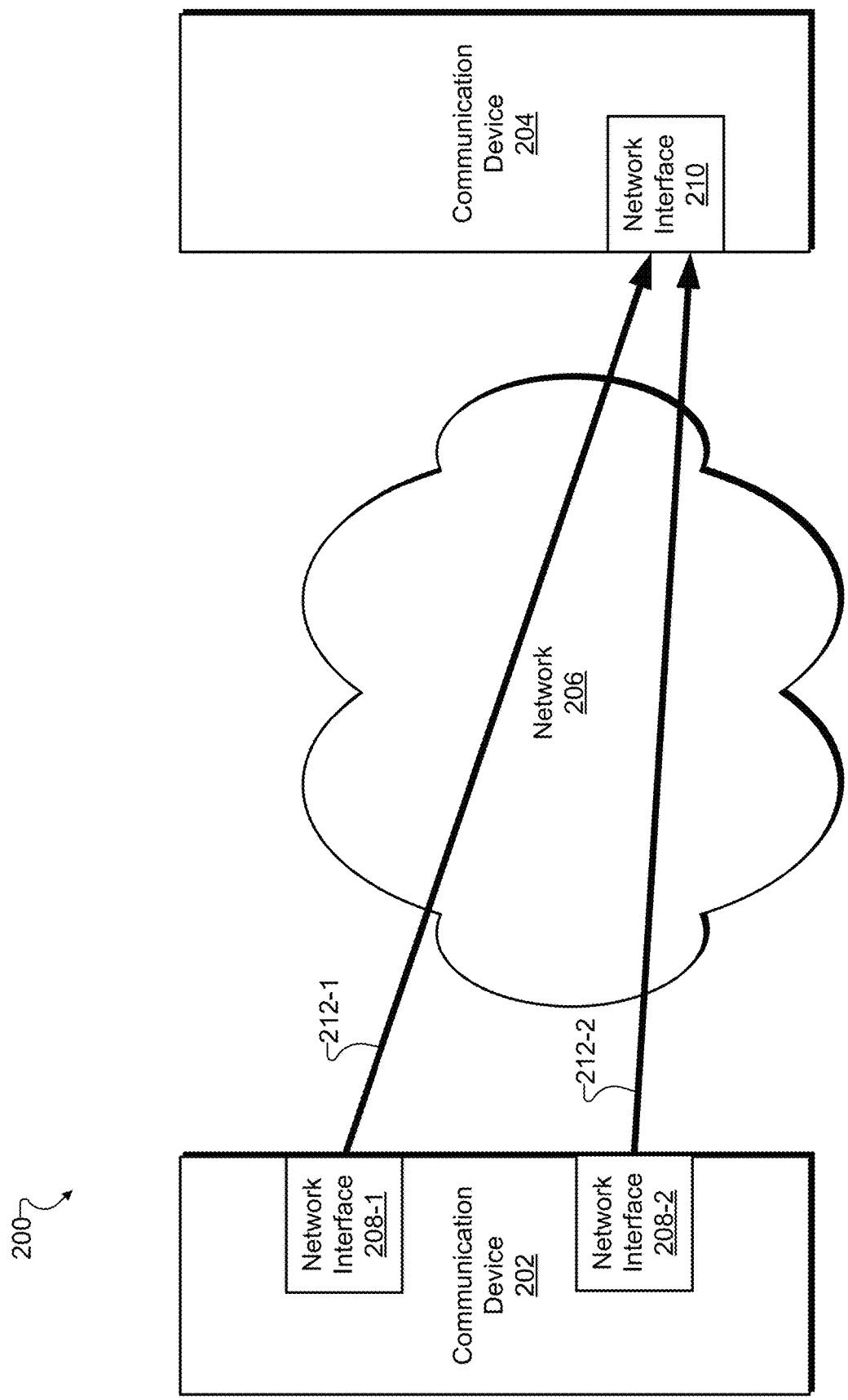
FIGS. 2-3 illustrate exemplary configurations in which exemplary implementations of the communication device of FIG. 1 concurrently transmit and receive object data by way of parallel network interfaces according to principles described herein.

FIG. 2 illustrates an exemplary configuration 200 in which exemplary implementations of device 100 concurrently transmit and receive object data by way of parallel network interfaces. Specifically, as shown, FIG. 2 includes a first communication device 202 communicatively coupled with a second communication device 204 by way of a network 206. Communication device 202 and communication device 204 each connect to network 206 by way of one or more network interfaces. For example, as shown, communication device 202 connects to network 206 by way of network interfaces 208 (e.g., network interfaces 208-1 and 208-2), while communication device 204 connects to network 206 by way of network interface 210. Thus, as shown, object data portions 212 (e.g., object data portions 212-1 and 212-2) may be transmitted from communication device 202 by way of network 206 (e.g., including by way of parallel network interfaces 208, and network interface 210) to be received by communication device 204.

Communication devices 202 and 204 may each include or implement device 100, described above in relation to FIG. 1. For example, communication device 202 may be an exemplary implementation of device 100 that concurrently transmits object data by way of parallel network interfaces (e.g., network interfaces 208), while communication device 204 may be an exemplary implementation of device 100 that receives concurrently transmitted object data by way of the parallel network interfaces. In other words, even though communication device 204 may be configured to use only a single network interface (i.e., network interface 210) to receive the object data transmitted by communication device 202, communication device 204 may still be said to receive concurrently transmitted object data by way of parallel network interfaces because the object data is transmitted by way of parallel network interfaces 208. Similarly, in other examples (not explicitly shown), communication device 202 may transmit data by way of a single network interface and communication device 204 may receive concurrently transmitted object data by way of parallel network interfaces by receiving the transmitted object data over parallel network interfaces. In yet other examples, as described below in relation to FIG. 3, both the transmitting and the receiving communication devices may connect to the network by way of parallel network interfaces.

Communication devices 202 and 204 may each include and/or be implemented by any suitable communication device or devices capable of transmitting and/or receiving object data partitioned into first and second portions in accordance with a data partitioning protocol. For example, communication device 202 may include or be implemented by an upload box device. An upload box device may include or be implemented by a computing device configured to receive data from multiple local sources (e.g., video capture units positioned in a vicinity of the upload box device) and to transmit the data to a remote destination (e.g., to a remote server configured to process the data). In other examples, communication device 202 may include or be implemented by a mobile or wireless device (e.g., a smartphone, a tablet device, a mobile reader, etc.), a personal computer device (e.g., a desktop computer, a laptop computer, etc.), a head-mounted virtual reality device (e.g., a virtual reality gaming device), or any other device that may serve a particular implementation to prepare and concurrently transmit the object data by way of the parallel network interfaces.

Similarly, communication device 204 may include or be implemented by a processing server device (e.g., a remote server configured to process the object data by stitching the object data together or otherwise combining and/or processing the object data to generate a renderable object data aggregation), a mobile or wireless device, a personal computer device, a head-mounted virtual reality device, or any other device that may serve a particular implementation to receive the concurrently transmitted object data by way of the parallel network interfaces, identify the data partitioning protocol, and combine and/or otherwise process the object data into a renderable object data aggregation.

While both communication devices 202 and 204 may implement or include implementations of device 100 as described above, in certain examples, communication device 202 and communication device 204 may include or be implemented by different types of communication devices. For example, in configuration 200, communication device 202 may be an upload box device that sends object data captured by several video capture units, and communication device 204 may be a processing server configured to process (e.g., stitch together and/or otherwise combine) the object data into a renderable object data aggregation. More specifically, the upload box device may send object data representative of a 360° video image of a real-world scene to a processing server that stitches the object data together (e.g., to form virtual reality media content including the 360° video image) and that transmits the resulting object data aggregation (e.g., the virtual reality media content) to other devices (e.g., media player devices configured to render the virtual reality media content) so that users of the other devices can experience the real-world scene represented by the object data aggregation.

In other examples, communication device 202 and communication device 204 may include or be implemented by the same type of communication device. For example, communication devices 202 and 204 may each be implemented by servers or by mobile devices or by any other type of communication device that may intercommunicate object data with other similar communication devices.

Communication devices 202 and 204 may communicate with one another using any suitable communication technologies, devices, media, and/or protocols supportive of data communications. For example, network interfaces 208 and 210 may be configured to each provide communicative access to networks such as cellular data networks, wireless local area networks (e.g., WiFi networks), wired local area networks, and/or various other types or subtypes of networks. In some examples, network interfaces 208-1 and 208-2 may be configured to each provide communicative access to a different network selected from a group of networks including at least a cellular data network, a wireless local area network, and a wired local area network.

Accordingly, while only one network 206 is shown interconnecting communication devices 202 and 204 in FIG. 2, it will be understood that network 206 may represent multiple interconnected networks using various networking technologies as may serve a particular implementation. For example, network 206 may include and/or represent any provider-specific network (e.g., a cable or satellite carrier network or a mobile telephone network), the Internet, a wide area network, and/or any other suitable network that may be accessed using network interfaces 208 and/or 210. Moreover, other networks, protocols, and/or network technologies may be incorporated within network 206 including, but not limited to socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies as may serve a particular implementation.

Figure 3:
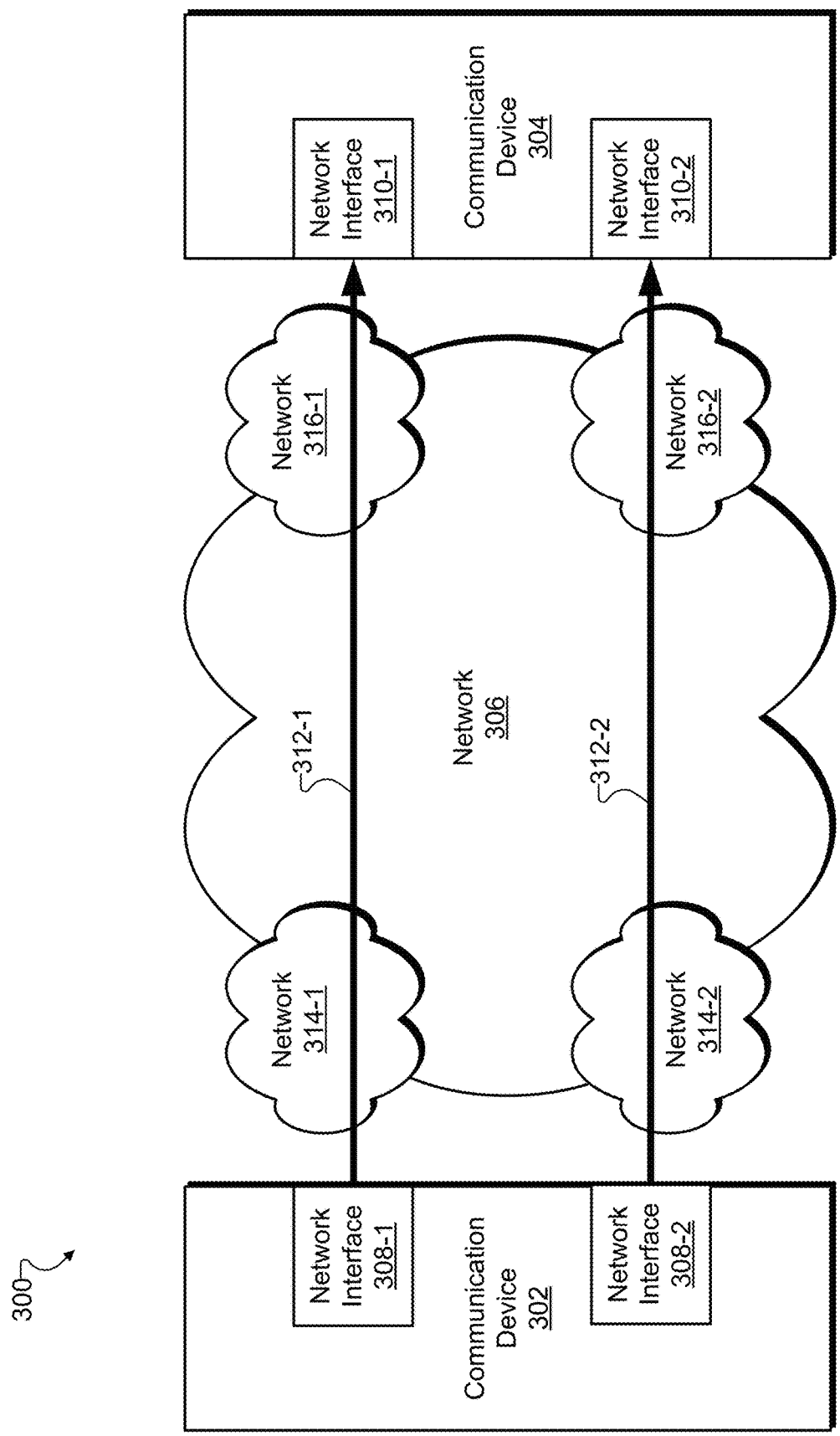

To illustrate how multiple interconnected networks may facilitate the concurrent transmission of object data by way of parallel network interfaces, FIG. 3 illustrates an exemplary configuration 300 in which exemplary implementations of device 100 concurrently transmit and receive object data by way of parallel network interfaces and by way of multiple interconnected networks. Specifically, as shown, FIG. 3 includes a first communication device 302 communicatively coupled with a second communication device 304 by way of a network 306. Except as specifically described below, communication devices 302 and 304 may be similar or the same as communication devices 202 and 204, respectively, described above in relation to FIG. 2. Similarly, network 306 may be similar to network 206, described above in relation to FIG. 2.

As shown, communication device 302 and communication device 304 each connect to network 306 by way of multiple parallel network interfaces. Specifically, communication device 302 connects to network 306 by way of network interfaces 308 (e.g., network interfaces 308-1 and 308-2), just as communication device 202 connected to network 206 by way of network interfaces 208 in configuration 200 of FIG. 2. Unlike configuration 200, however, where communication device 204 connected to network 206 by way of just one network interface 210, in configuration 300, communication device 304 connects to network 306 by way of parallel network interfaces 310 (e.g., network interfaces 310-1 and 310-2). Accordingly, as shown, object data portions 312 (e.g., object data portions 312-1 and 312-2) may be transmitted by way of network 306 (e.g., including by way of parallel network interfaces 308, and parallel network interfaces 310) to be received by communication device 304.

Additionally, in contrast to configuration 200, additional subnetworks associated with each network interface are illustrated in FIG. 3. Specifically, networks 314-1 and 314-2 (referred to collectively as networks 314) are shown to be associated, respectively, with network interfaces 308-1 and 308-2, while networks 316-1 and 316-2 (referred to collectively as networks 316) are shown to be associated, respectively, with network interfaces 310-1 and 310-2. Networks 314 and networks 316 may represent networks to which respective network interfaces (e.g., network interfaces 308 and/or 310) may provide communicative access, including, for example, cellular data networks, wireless local area networks, wired local area networks, and the like. As such, networks 314 and 316 may be communicatively coupled by way of network 306, which may represent the Internet and/or other networks and/or network technologies including, for examples, the technologies described above with respect to network 206.

In certain examples, the first network interface and the second network interface for a particular communication device (e.g., network interfaces 308-1 and 308-2 of communication device 302, or network interfaces 310-1 and 310-2 of communication device 304) may be configured to each provide communicative access to different networks. In other words, networks 314-1 and 314-2 may be different from one another and networks 316-1 and 316-2 may also be different from one another. For example, network 314-1 may represent a cellular data network and network interface 308-1 may represent a cellular data network interface (e.g., including hardware, software, antennas, etc., adapted to communicate by way of the cellular data network), while network 314-2 may represent a wireless local area network (e.g., a WiFi network) and network interface 308-2 may represent a wireless network interface (e.g., including hardware, software, antennas, etc., adapted to communicate by way of the wireless local area network). Similarly, network 316-1 may represent a cellular data network (e.g., the same cellular data network or a different cellular data network associated with a different cellular data provider) and network interface 310-1 may represent a cellular data network interface, while network 316-2 may represent a wireless local area network and network interface 310-2 may represent a wireless network interface.

As described in the example above, networks 314 and 316 may be the same (i.e., network 314-1 may be the same type of network as network 316-1 and network 314-2 may be the same type of network as network 316-2). However, in certain examples, networks 314 and 316 may also be different from each other. For example, networks 314-1 and 314-2 may be a cellular data network and a wireless local area network, respectively, while networks 316-1 and 316-2 may be a wireless local area network and a wired local area network (e.g., Ethernet network), respectively.

As mentioned above, in order to concurrently transmit object data by way of parallel network interfaces, a first communication device (e.g., device 100 or an implementation thereof such as communication device 202 or 302) may prepare object data in accordance with a data partitioning protocol for transmission to a second communication device (e.g., device 100 or an implementation thereof such as communication device 204 or 304). In certain examples, the preparing of the object data in accordance with the data partitioning protocol may be performed by partitioning raw object data into a first data stream and a second data stream, which, respectively, may be transmitted as the first portion of the prepared object data (e.g., object data portion 212-1 or 312-1) and the second portion of the prepared object data (e.g., object data portion 212-2 or 312-2) in accordance with at least one data partitioning scheme.

As used herein, a "data partitioning protocol" may refer to any technique, procedure, routine, or approach for partitioning data (e.g., object data) in preparation for transmitting the data. For example, for many types of object data, a data partitioning protocol may partition an instance of object data into chunks that may be assigned to the first or second data streams and labeled so as to be recombinable at a destination after the chunks are individually transmitted by way of the parallel network interfaces. Such labeling may include, for example, an object identification indicative of the object to which each chunk of the instance of object data relates, an identification number (e.g., a serialized identification number) indicative of how each chunk relates to the other chunks within the instance of object data, and the like. The chunks of the instance of object data may be labeled in any suitable way. For example, each chunk may be labeled by appending metadata to each chunk, or a file describing each chunk may be generated and transmitted (e.g., prior to or subsequent to transmitting the chunks of the instance of the object data). Data partitioning protocols may take any form as may serve a particular implementation. For example, a data partitioning protocol may be embodied in hardware (e.g., by logic circuits, etc.), in software (e.g., by a set of computer-readable instructions), or in any other suitable way. In certain examples (e.g., particularly in examples involving object data that includes video data), the data partitioning protocol may include or be implemented by one or more data partitioning schemes such the data partitioning schemes described and illustrated below.

In particular, as will be described and illustrated in more detail below, in a first data partitioning scheme, raw object data may be representative of an integrated video image captured by a single video capture unit, the first data stream may be representative of a first section of the integrated video image, and the second data stream may be representative of a second section of the integrated video image split off from the first section of the integrated video image. In a second data partitioning scheme, the raw object data may be representative of a plurality of discrete video images each captured by a different video capture unit from a plurality of video capture units, the first data stream may be representative of a first set of one or more video images in the plurality of discrete video images, and the second data stream may be representative of a second set of one or more video images in the plurality of discrete video images. In a third data partitioning scheme, the raw object data may be representative of at least one video image captured by at least one video capture unit, the first data stream may be representative of a first plurality of frames of the at least one video image and having one or more frame types included in a first set of one or more frame types, and the second data stream may be representative of a second plurality of frames of the at least one video image and having one or more frame types included in a second set of one or more frame types, wherein the one or more frame types included in the first set of one or more frame types are different than the one or more frame types included in the second set of one or more frame types.

Additionally, as will be further illustrated and described below, the preparing of the object data in accordance with the data partitioning protocol may include dynamically monitoring the first and second data transfer rates at which the first and second portions of the prepared object data are transmitted, and, in response to detecting a change in at least one of the first and second data transfer rates based on the dynamic monitoring, making dynamic changes to the first and second data streams being partitioned using the one or more data partitioning schemes being performed. For example, if the communication device is using the first data partitioning scheme described above, the communication device may dynamically update a division within the integrated video image where the first section of the integrated video image is split off from the second section of the integrated video image such that the first section of the integrated video image acquires part of the second section of the integrated video image. Similarly, if the communication device is using the second data partitioning scheme described above, the communication device may dynamically reapportion a discrete video image included among the second set of one or more video images represented by the second data stream to be included among the first set of one or more video images represented by the first data stream. If the communication device is using the third data partitioning scheme described above, the communication device may dynamically reapportion a frame type included among the second set of one or more frame types of the second plurality of frames represented by the second data stream to be included among the first set of one or more frame types of the first plurality of frames represented by the first data stream.

Moreover, the preparing of the object data in accordance with the data partitioning protocol may include appending (e.g., to the prepared object data as the prepared object data is transmitted) partitioning data associated with the data partitioning protocol and indicative of a data combination scheme by which the second communication device is to combine the first portion of the object data and the second portion of the object data into a renderable object data aggregation. As such, the first communication device may transmit the partitioning data appended to the prepared object data to the second communication device along with the prepared object data. For example, the first communication device may transmit the partitioning data by way of at least one of the first network interface (e.g., network interface 208-1 or 308-1) and the second network interface (e.g., network interface 208-2 or 308-2).

Figure 4:
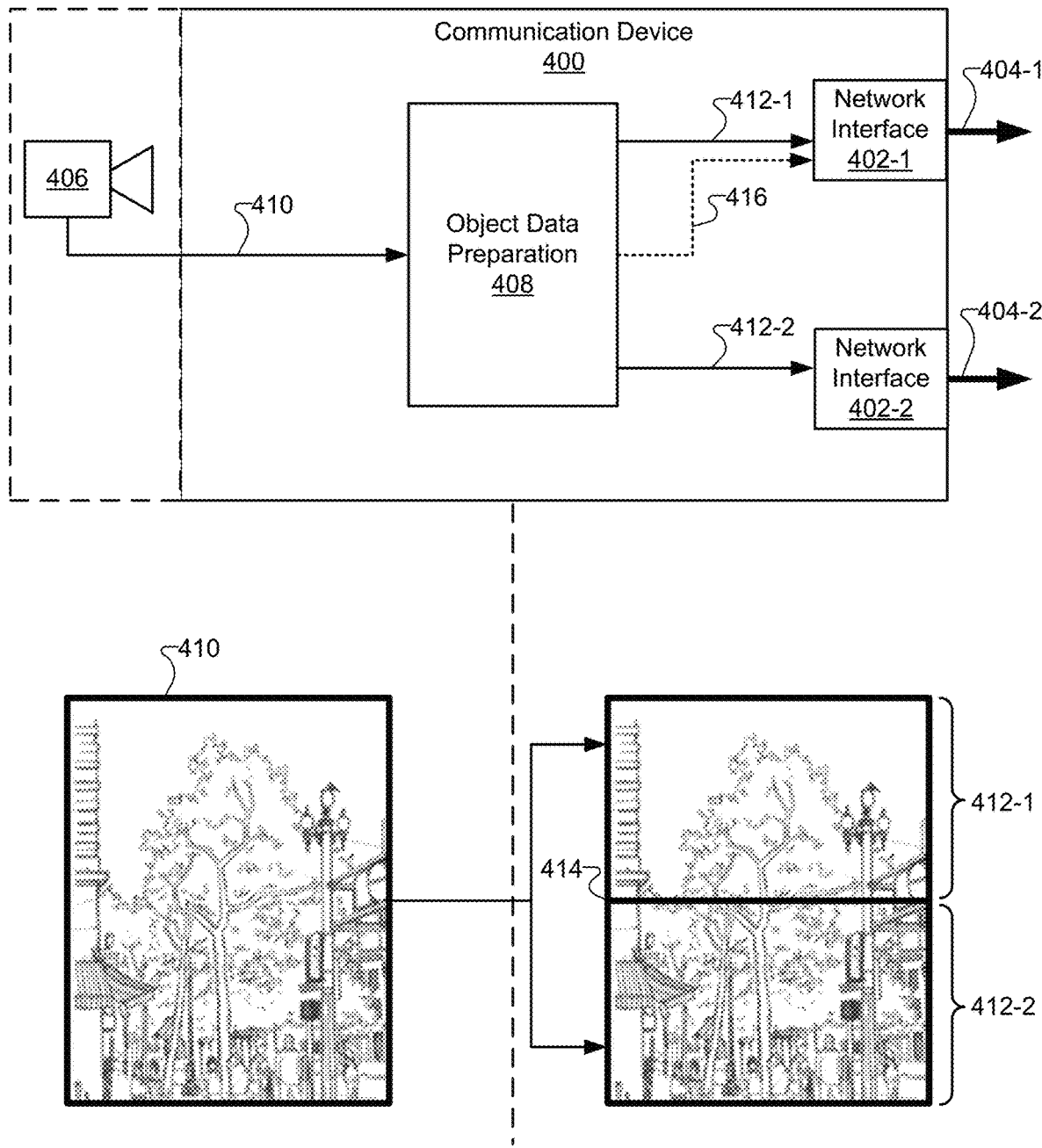
FIG. 4 illustrates an exemplary data partitioning scheme used by the communication device of FIG. 1 to partition raw video into first and second data streams to be concurrently transmitted by way of parallel network interfaces according to principles described herein.
Figure 5:
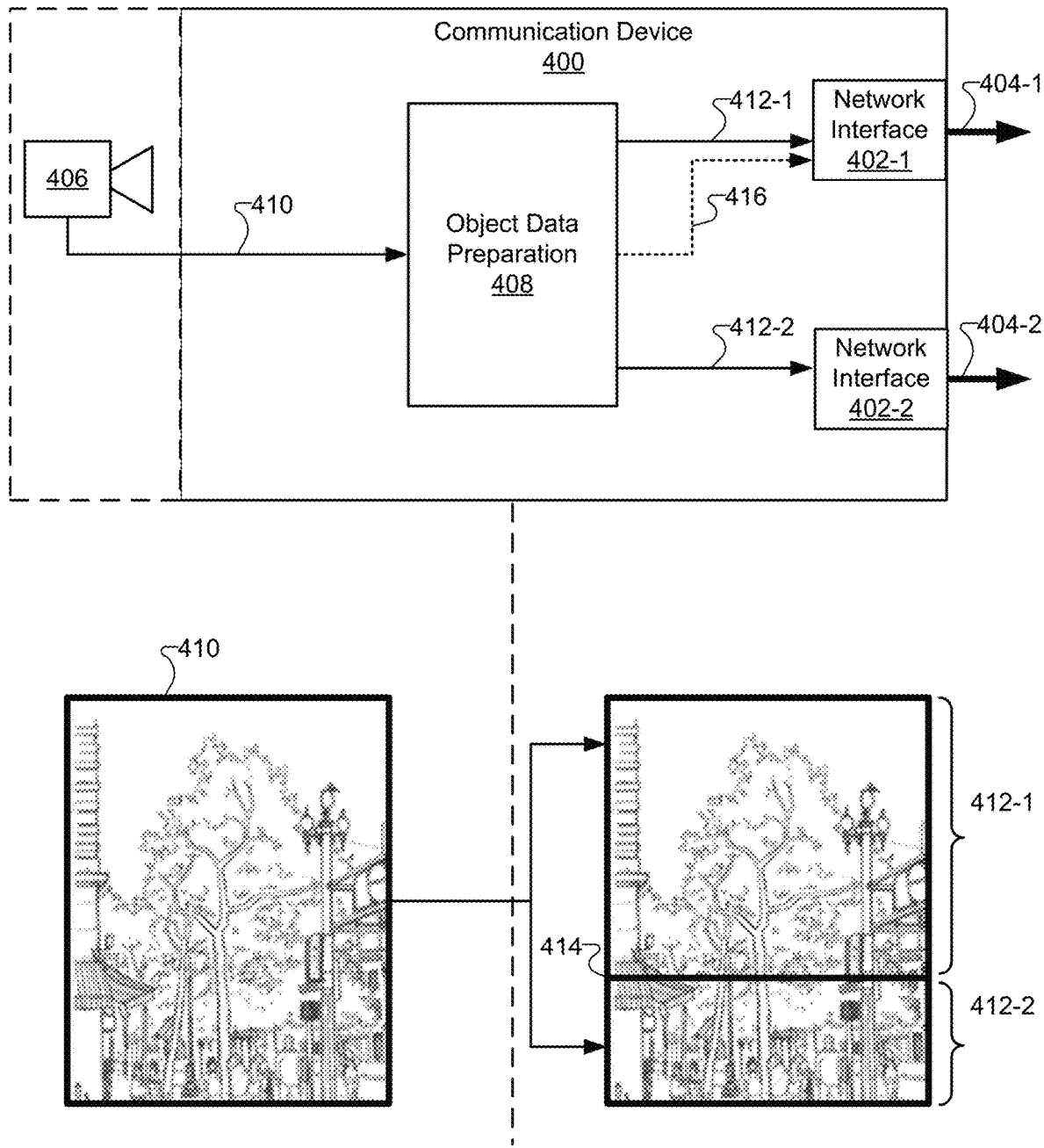
FIG. 5 illustrates an exemplary dynamic change to the first and second data streams partitioned by the communication device of FIG. 1 using the exemplary data partitioning scheme of FIG. 4 according to principles described herein.
Figure 6:
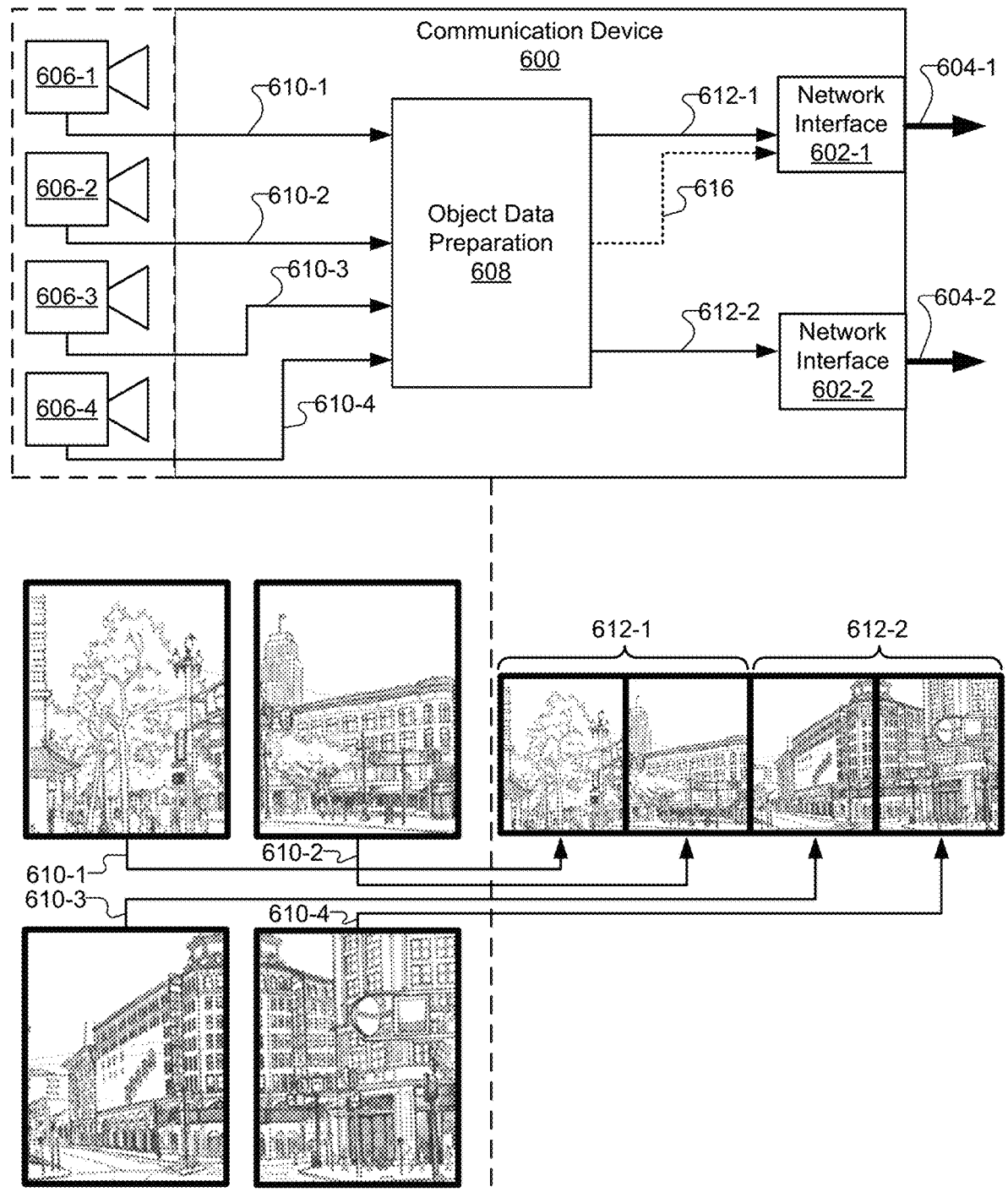
FIG. 6 illustrates another exemplary data partitioning scheme used by the communication device of FIG. 1 to partition raw video into first and second data streams to be concurrently transmitted by way of parallel network interfaces according to principles described herein.
Figure 7:
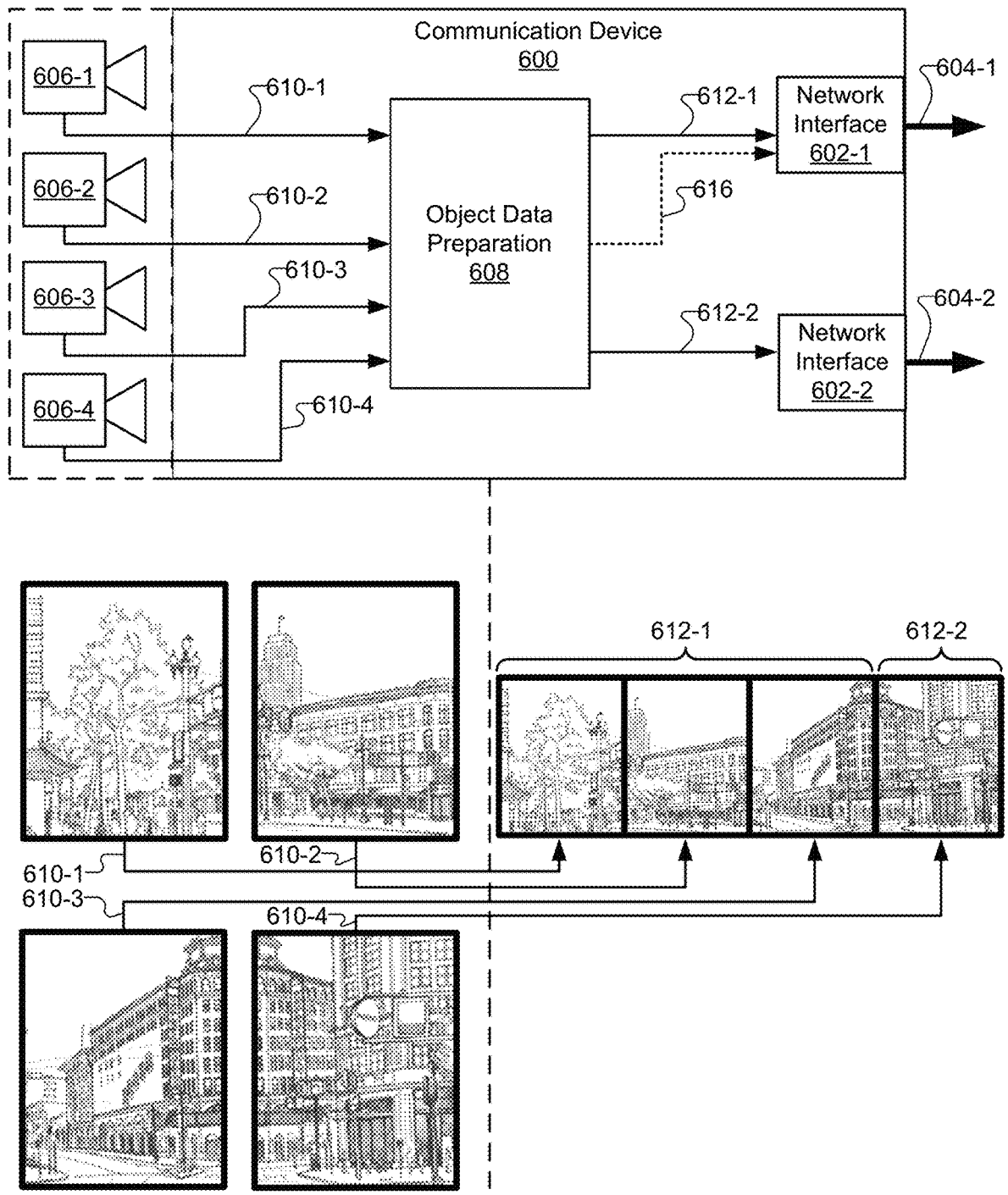
FIG. 7 illustrates an exemplary dynamic change to the first and second data streams partitioned by the communication device of FIG. 1 using the exemplary data partitioning scheme of FIG. 6 according to principles described herein.
Figure 8:
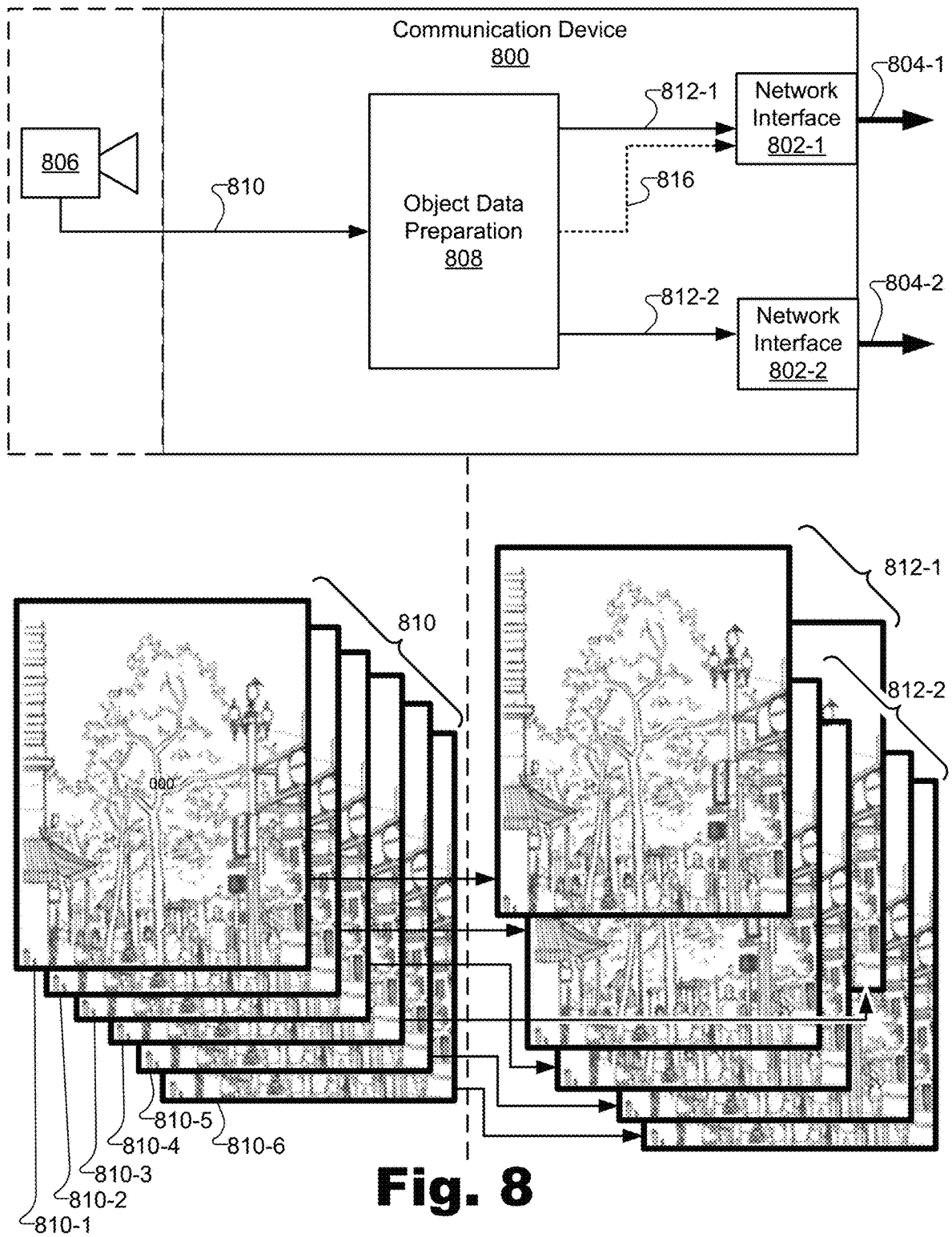
FIG. 8 illustrates yet another exemplary data partitioning scheme used by the communication device of FIG. 1 to partition raw video into first and second data streams to be concurrently transmitted by way of parallel network interfaces according to principles described herein.
Figure 9:
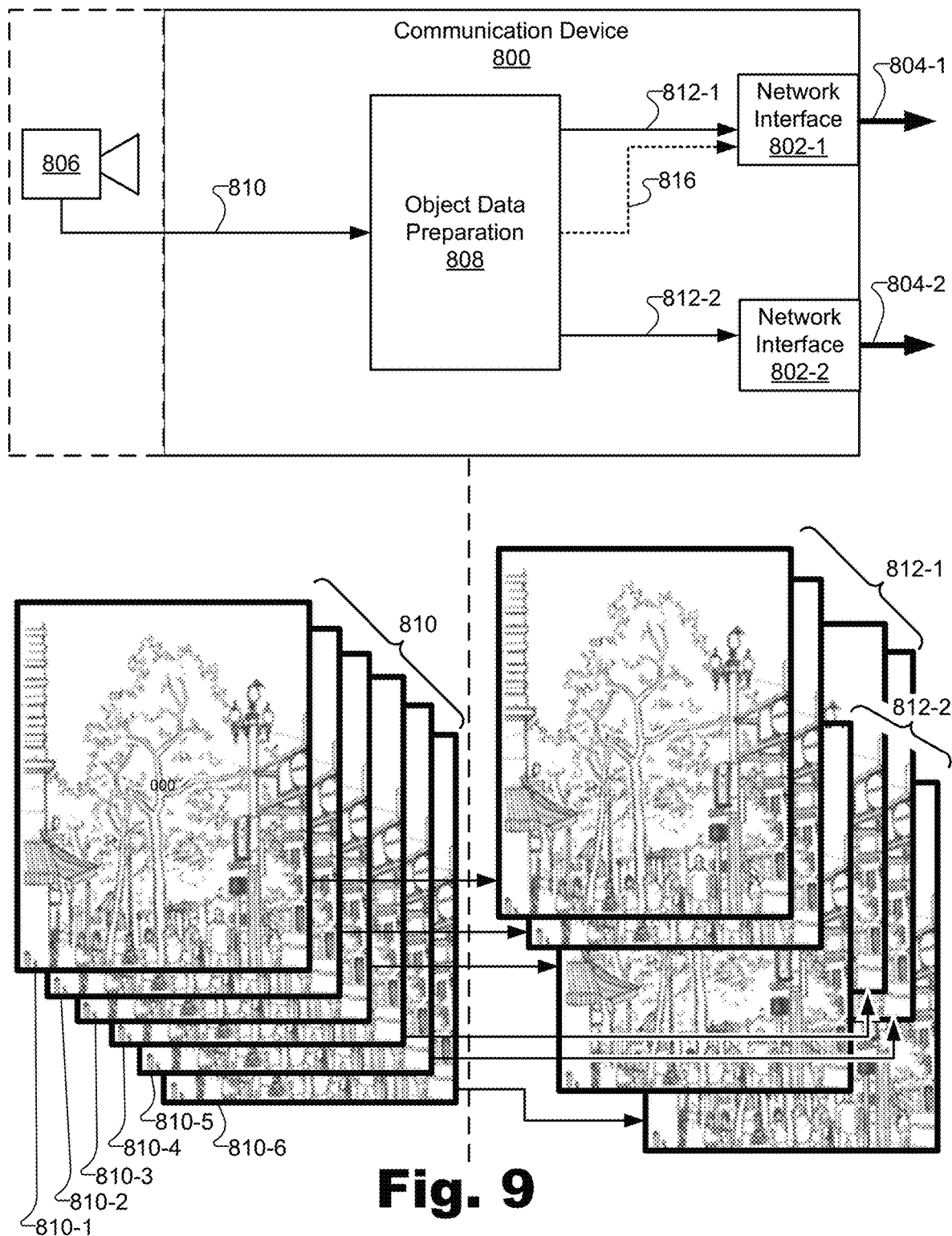
FIG. 9 illustrates an exemplary dynamic change to the first and second data streams partitioned by the communication device of FIG. 1 using the exemplary data partitioning scheme of FIG. 8 according to principles described herein.

To illustrate, FIGS. 4, 6, and 8 show exemplary data partitioning schemes (i.e., the first, second, and third data partitioning schemes described above, respectively) used by device 100 to partition raw video into first and second data streams to be concurrently transmitted by way of parallel network interfaces. FIGS. 4, 6, and 8 further show exemplary partitioning data associated with the data partitioning protocol (i.e., one or more of the data partitioning schemes) and appended to the prepared object data being transmitted. In turn, FIGS. 5, 7, and 9 illustrate exemplary dynamic changes to the first and second data streams being partitioned by device 100 using the respective data partitioning schemes of FIGS. 4, 6, and 8 (i.e., the first, second, and third data partitioning schemes, respectively).

Specifically, FIG. 4 illustrates the first data partitioning scheme described above for partitioning raw video into first and second data streams to be concurrently transmitted by way of parallel network interfaces. As shown, a communication device 400 may include parallel network interfaces 402 (e.g., network interfaces 402-1 and 402-2) transmitting respective object data portions 404 (e.g., object data portions 404-1 and 404-2). Communication device 400 may implement device 100 and, as such, communication device 400, network interfaces 402, and object data portions 404 may each be similar or identical to other communication devices, network interfaces, and/or transmitted data described herein (e.g., described above with respect to FIGS. 1-3).

FIG. 4 also shows a video capture unit 406 communicatively coupled by way of a data transfer interface with an object data preparation unit 408. As illustrated by the dotted lines around video capture unit 406, video capture unit 406 may be included as part of communication device 400 or may be separate from (but communicatively coupled with) communication device 400 as may serve a particular implementation. As such, the data transfer interface communicatively coupling video capture unit 406 and object data preparation unit 408 may include any interface by which data may be transferred such as an internal communication bus (e.g., connecting peripherals such as a video camera or connecting a hard drive of communication device 400 to a central processor of communication device 400), an external interface (e.g., a wireless data connection such as a WiFi network, or a wired data connection such as a USB connection, a Firewire connection, an HDMI connection, etc.), or another means of data transfer as may serve a particular implementation.

Regardless of whether video capture unit 406 is internal or external to communication device 400, video capture unit 406 may represent any suitable object data source from which communication device 400 may obtain or access object data. For example, video capture unit 406 may represent a video camera (e.g., a high-resolution video camera, a 360° video camera, etc.) that is capturing video data of a real-world scene and transferring the video data to object data preparation unit 408 within communication device 400. In other examples, video capture unit 406 may represent a data storage unit (e.g., a hard drive or the like) in which object data (e.g., video data) is stored and may be loaded up by object data preparation unit 408. In yet other examples, video capture unit 406 may represent yet other internal or external sources of object data by which object data preparation unit 408 may receive, generate, load up, or otherwise access object data for concurrent transmission by way of parallel network interfaces 402. In certain examples, video capture unit 406 and/or other video capture units described herein may generate, access, and/or provide object data that is not video data but is another type of object data. In other examples, video capture units such as video capture unit 406 may be replaced by an object data generator or another component configured to receive, generate, load up, or otherwise access any type of object data (e.g., non-video object data).

As shown, video capture unit 406 may transfer raw object data 410 (e.g., object data that has yet to be transmitted to a final destination, combined or processed into a final form, etc.) to object data preparation unit 408. For example, as illustrated below communication device 400 in FIG. 4, if video capture unit 406 is a video camera capturing real-world scenery of a city street, raw object data 410 may represent video data representative of the real-world scenery (i.e., the city street depicted in the picture below communication device 400).

Object data preparation unit 408 may receive raw object data 410 and prepare raw object data 410 in accordance with a data partitioning protocol (e.g., for concurrent transmission by way of parallel network interfaces 402) by partitioning raw object data 410 into a first data stream 412-1 and a second data stream 412-2 (e.g., referred to collectively as data streams 412). As shown, data stream 412-1 may then be transmitted as object data portion 404-1 by way of network interface 402-1 while data stream 412-2 may be transmitted as object data portion 404-2 by way of network interface 402-2.

More specifically, the data partitioning protocol in accordance with which object data preparation unit 408 prepares raw object data 410 may include (e.g., utilize, implement, etc.) one or more of the data partitioning schemes described herein. For example, as shown below communication device 400, the data partitioning protocol used by object data preparation unit 408 may include the first data partitioning scheme in which raw object data 410 is representative of an integrated video image captured by a single video capture unit (e.g., video capture unit 406), data stream 412-1 is representative of a first section (e.g., a top section) of the integrated video image, and data stream 412-2 is representative of a second section (e.g., a bottom section) of the integrated video image split off from the first section of the integrated video image. As shown, the first section and the second section of the integrated video image represented by raw object data 410 may be divided by a division 414 (e.g., a horizontal division in the example of FIG. 4). It will be understood that the first section and the second section may be a left section and a right section (i.e., divided by a vertical division) and/or any other type of sections or divisions of the integrated video image as may serve a particular implementation. Additionally, in certain examples, more than two sections may be used, the more than two sections corresponding to more than two data streams 412, more than two network interfaces 402, and more than two object data portions 404.

In certain implementations, object data preparation unit 408 may prepare raw object data 410 in accordance with the data partitioning protocol (e.g., including the first data partitioning scheme) by dynamically monitoring the respective data transfer rates at which object data portions 404 are transmitted, and, in response to detecting a change in one of the data transfer rates based on the dynamic monitoring, dynamically changing data streams 412 as data streams 412 are being partitioned using the data partitioning protocol. For example, in response to a detection (i.e., based on the dynamic monitoring) that a data transfer rate associated with network interface 402-1 has increased and/or that a data transfer rate associated with network interface 402-2 has decreased (e.g., due to network conditions, etc.), object data preparation unit 408 may dynamically update division 414 such that the first section of the integrated video image represented by data stream 412-1 acquires part of the second section of the integrated video image represented by data stream 412-2.

To illustrate, FIG. 5 is nearly identical to FIG. 4 except that division 414 has been dynamically updated (i.e., moved lower) within the integrated video image. Accordingly, as illustrated in FIG. 5, based on the dynamic update of division 414, data stream 412-1 may acquire part of the integrated video image that was previously assigned to data stream 412-2 (compare to FIG. 4). As a result, data stream 412-1 may be associated with more object data and data stream 412-2 may be associated with less object data as compared to the division in FIG. 4.

The dynamic changes described above may help ensure that the concurrent transmission of the object data over parallel network interfaces 402 is as fast as possible. For example, if network interface 402-1 is dynamically monitored to presently be associated with a faster data transfer rate than a data transfer rate associated with network interface 402-2, network interface 402-1 may be tasked (e.g., by the data partitioning protocol in which the dynamic changes are included) to transmit a larger amount of object data (i.e., data stream 412-1) as compared to network interface 402-2 (i.e., transmitting data stream 412-2).

Additionally or alternatively, the dynamic changes described above may help ensure that the concurrent transmission of the object data over parallel network interfaces 402 is as cost-efficient as possible. For example, if network interface 402-1 is associated with a network that is less costly to use (e.g., a wireless local area network) and network interface 402-2 is associated with a network that is more costly to use (e.g., a cellular data network), network interface 402-1 may always be tasked (e.g., based on the dynamic monitoring and by the data partitioning protocol in which the dynamic changes are included) with transmitting as much object data (i.e., data stream 412-1) as permitted by the present data transfer rate associated with network interface 402-1, while network interface 402-2 may be tasked with transmitting a smaller portion of the object data (i.e., data stream 412-2) in order to meet a minimum overall data transfer rate target designated for a particular implementation.

In order for the object data to be combined after transmission, object data preparation unit 408 may further generate and/or append to at least one of data streams 412 some partitioning data 416. For example, as shown in FIGS. 4 and 5, partitioning data 416 may be appended to data stream 412-1 to be transmitted by way of network interface 402-1 along with object data portion 404-1. In other examples, partitioning data 416 may be appended to data stream 412-2 to be transmitted by way of network interface 402-2 along with object data portion 404-2, or to both data streams 412 to be transmitted by way of both network interfaces 402.

Partitioning data 416 may take any form as may serve a particular implementation. For example, partitioning data 416 may be a file (e.g., a manifest file or the like) that is transmitted prior to, subsequent to, or concurrently with the object data of object data portions 404. In other examples, partitioning data 416 may be metadata included (e.g., within a packet header) with object data portions 404. In certain implementations, partitioning data 416 may include data allowing the partitioning of raw object data 410 to be reversed in accordance with the one or more data partitioning schemes used as part of the data partitioning protocol. In other words, partitioning data 416 may provide data allowing object data portions 404 to be recombined back into the form of raw object data 410. In the same or other implementations, partitioning data 416 may include data allowing the transmitted object data of object data portions 404 to be combined, stitched, and/or otherwise processed into a new form such as a renderable object data aggregation. Specific examples of renderable object data aggregations will be described in more detail below.

As another exemplary implementation, FIG. 6 illustrates the second data partitioning scheme described above for partitioning raw video into first and second data streams to be concurrently transmitted by way of parallel network interfaces. As shown, a communication device 600 may include parallel network interfaces 602 (e.g., network interfaces 602-1 and 602-2) each transmitting a respective object data portion 604 (e.g., object data portions 604-1 and 604-2). Communication device 600 may implement device 100 and, as such, communication device 600, network interfaces 602, and object data portions 604 may each be similar or identical to other communication devices, network interfaces, and/or transmitted data described herein (e.g., described above with respect to FIGS. 1-5).

FIG. 6 also shows a plurality of video capture units 606 (e.g., video capture units 606-1 through 606-4) communicatively coupled by way of one or more data transfer interfaces with an object data preparation unit 608. As illustrated by the dotted lines around video capture units 606, video capture units 606 may be included as part of communication device 600 or may be separate from (but communicatively coupled with) communication device 600 as may serve a particular implementation. In certain examples, one or more video capture units 606 may be included as part of communication device 600 while one or more other video capture units 606 may be separate from communication device 600. As with the data transfer interface communicatively coupling video capture unit 406 and object data preparation unit 408, the data transfer interface (or interfaces) communicatively coupling video capture units 606 and object data preparation unit 608 may include any interface by which data may be transferred such as an internal communication bus, an external interface, another means of data transfer, and/or any combination thereof as may serve a particular implementation.

Like video capture unit 406 described above, regardless of whether video capture units 606 are internal or external to communication device 600, each video capture unit 606 may represent any suitable object data source from which communication device 600 may obtain object data, (e.g., including object data sources that provide non-video object data). For example, video capture units 606 may each represent a video camera, a data storage unit, and/or other internal or external sources of object data by which object data preparation unit 608 may receive, generate, load up, or otherwise obtain object data for concurrent transmission by way of parallel network interfaces 602. In some examples, one or more video capture units 606 may represent one type of video capture unit (e.g., a video camera), while other video capture units 606 may represent a different type of video capture unit (e.g., a data storage unit, an object data generator that provides non-video object data, etc.).

Additionally, similar to video capture unit 406, each video capture unit 606 may transfer a stream of raw object data 610 (e.g., raw object data 610-1 through 610-4) to object data preparation unit 608. For example, as illustrated below communication device 600 in FIG. 6, if video capture units 606 are each video cameras capturing real-world scenery of a city street (e.g., located and/or positioned to capture different parts of the city street so that, when combined, a panoramic video image or 360° video image may be formed), each stream of raw object data 610 may represent video data representative of a different part of the real-world scenery (i.e., a different part of the city street depicted in the picture below communication device 600).

Object data preparation unit 608 may receive raw object data 610 and prepare raw object data 610 in accordance with a data partitioning protocol (e.g., for concurrent transmission by way of parallel network interfaces 602) by partitioning raw object data 610 into a first data stream 612-1 and a second data stream 612-2 (e.g., referred to collectively as data streams 612). As shown, data stream 612-1 may then be transmitted as object data portion 604-1 by way of network interface 602-1, while data stream 612-2 may be transmitted as object data portion 604-2 by way of network interface 602-2.

More specifically, the data partitioning protocol in accordance with which object data preparation unit 608 prepares raw object data 610 may include (e.g., utilize, implement, etc.) one or more of the data partitioning schemes described herein. For example, as shown below communication device 600, the data partitioning protocol used by object data preparation unit 608 may include the second data partitioning scheme in which raw object data 610 is representative of a plurality of discrete video images each captured by a different video capture unit from a plurality of video capture units (e.g., video capture units 606), data stream 612-1 is representative of a first set of one or more video images in the plurality of discrete video images (e.g., video images represented by raw object data 610-1 and 610-2), and data stream 612-2 is representative of a second set of one or more video images in the plurality of discrete video images (e.g., video images represented by raw object data 610-3 and 610-4).

While only the second data partitioning scheme is illustrated in FIG. 6 for clarity of illustration, it will be understood that data partitioning protocols used by object data preparation unit 608 and/or by other object data preparation units described herein may use additional data partitioning schemes. For example, a data partitioning protocol using both the first and second data partitioning schemes may assign two and a half video images (e.g., video images represented by raw object data 610-1, 610-2, and a top portion of raw object data 610-3) to data stream 612-1 while assigning one and a half video images (e.g., video images represented by raw object data 610-4 and a bottom portion of raw object data 610-3) to data stream 612-2. In a similar way, other combinations of any data partitioning schemes described herein may be employed as may serve a particular implementation. Additionally, it will be understood that more than two data streams 612 may be used (e.g., along with more than two network interfaces 602, and more than two object data portions 604) to implement the second data partitioning scheme when more than two video capture units 606 are generating more than two streams of raw object data 610.

In certain implementations, object data preparation unit 608 may prepare raw object data 610 in accordance with the data partitioning protocol (e.g., including the second data partitioning scheme) by dynamically monitoring the respective data transfer rates at which object data portions 604 are transmitted, and, in response to detecting a change in one of the data transfer rates based on the dynamic monitoring, dynamically changing data streams 612 as data streams 612 are being partitioned using the data partitioning protocol. For example, in response to a detection (i.e., based on the dynamic monitoring) that a data transfer rate associated with network interface 602-1 has increased and/or that a data transfer rate associated with network interface 602-2 has decreased (e.g., due to network conditions, etc.) object data preparation unit 608 may dynamically reapportion a discrete video image included among the second set of one or more video images represented by data stream 612-2 (e.g., a video image represented by raw object data 610-3) to be included among the first set of one or more video images represented by data stream 612-1.

To illustrate, FIG. 7 is nearly identical to FIG. 6 except that the discrete video image represented by raw object data 610-3 is included among the first set of one or more video images represented by data stream 612-1, rather than among the second set of one or more video images represented by data stream 612-2 (as was the case in FIG. 6). As a result, data stream 612-1 may be associated with more object data and data stream 612-2 may be associated with less object data as compared with the sets of video images assigned in FIG. 6. As with the dynamic changes described in relation to FIGS. 4-5, these dynamic changes to data streams 612 may similarly help ensure that the concurrent transmission of the object data over parallel network interfaces 602 is as fast and/or cost-efficient as possible for the same reasons described above.

In order for the object data to be combined after transmission, object data preparation unit 608 may further generate and/or append to at least one of data streams 612 some partitioning data 616. For example, as shown in FIGS. 6 and 7, partitioning data 616 may be appended to data stream 612-1 to be transmitted by way of network interface 602-1 along with object data portion 604-1. In other examples, partitioning data 616 may be appended to data stream 612-2 to be transmitted by way of network interface 602-2 along with object data portion 604-2, or to both data streams 612 to be transmitted by way of both network interfaces 602.

As with partitioning data 416 described above, partitioning data 616 may take any form as may serve a particular implementation, such as, for example, a file, metadata included within a packet header, or the like. Additionally, partitioning data 616 may similarly include data allowing the partitioning of raw object data 610 to be reversed (e.g., recombined back into the form of raw object data 610) and/or to be combined, stitched, and/or otherwise processed into a new form (e.g., into a renderable object data aggregation).

As yet another exemplary implementation, FIG. 8 illustrates the third data partitioning scheme described above for partitioning raw video into first and second data streams to be concurrently transmitted by way of parallel network interfaces. As shown, a communication device 800 may include parallel network interfaces 802 (e.g., network interfaces 802-1 and 802-2) each transmitting a respective object data portion 804 (e.g., object data portions 804-1 and 804-2). Communication device 800 may implement device 100 and, as such, communication device 800, network interfaces 802, and object data portions 804 may each be similar or identical to other communication devices, network interfaces, and/or transmitted data described herein (e.g., described above with respect to FIGS. 1-7).

FIG. 8 also shows a video capture unit 806 communicatively coupled by way of a data transfer interface with an object data preparation unit 808. As illustrated by the dotted lines around video capture unit 806, video capture unit 806 may be included as part of communication device 800 or may be separate from (but communicatively coupled with) communication device 800 as may serve a particular implementation. In certain examples, a plurality of video capture units may be used (e.g., as illustrated above with respect to video capture units 606 in FIG. 6). As with the data transfer interfaces communicatively coupling video capture units 406 and 606 with object data preparation units 408 and 608, respectively, the data transfer interface communicatively coupling video capture unit 806 and object data preparation unit 808 may include any interface by which data may be transferred such as an internal communication bus, an external interface, another means of data transfer, and/or any combination thereof as may serve a particular implementation.

Like video capture units 406 and 606, described above, regardless of whether video capture units 806 are internal or external to communication device 800, video capture unit 806 may represent any suitable object data source from which communication device 800 may obtain object data (e.g., including object data sources that provide non-video object data). For example, video capture unit 806 may represent a video camera, a data storage unit, and/or another internal or external source of object data by which object data preparation unit 808 may receive, generate, load up, or otherwise obtain object data for concurrent transmission by way of parallel network interfaces 802.

Additionally, similar to video capture units 406 and 606, video capture unit 806 may transfer raw object data 810 to object data preparation unit 808. For example, as illustrated below communication device 800 in FIG. 8, if video capture unit 806 is a video camera capturing real-world scenery of a city street, raw object data 810 may represent video data representative of the real-world scenery. More particularly, raw object data 810 may include (e.g., may be implemented by) a plurality of frames (e.g., still images that, when presented in rapid succession, create a moving video image). As shown, the frames included within raw object data 810 are labeled as frames 810-1 through 810-6 in FIG. 8.

In certain implementations, the frames of raw object data 810 may each have (e.g., be associated with and/or characterized by) a particular frame type. For example, one frame type may be an "odd" frame type (e.g., not divisible by 2) while another frame type may be an "even" frame type (e.g., divisible by 2) such that frames of odd and even frame types are interleaved together in an odd-even-odd-even (A-B-A-B) pattern. In other examples, any other similar interleaving of frame types may be used as may serve a particular implementation (e.g., an A-A-B-A-A-B interleaved pattern, an A-A-B-B-A-A-B-B interleaved pattern, etc.).

In yet other examples, frame types may be associated with a particular video compression scheme in which video data is compressed according to different frame types (e.g., also referred to as "picture types"). For example, an intra-coded frame or "I-frame" may be a key frame that includes a fully specified picture like a conventional image, a predicted frame or "P-frame" may be a forward-predicted frame that includes only changes in the image from the previous frame (e.g., only encoding the movement of objects and not stationary backgrounds), a bi-predicted frame or "B-frame" may be a bi-directionally predicted frame that includes only changes in the image from both the previous frame and the subsequent frame, and other types of frames may also be used as may serve a particular implementation.

Due to differences in amounts of data that may be encoded in different types of frames, video may be compressed by surrounding frames that do not compress significantly (e.g., I-frames) with frames that compress more significantly because they rely on key frames and do not fully represent a picture (e.g., P-frames and/or B-frames). For example, in one implementation in which raw object data 810 is compressed, frame types may be interleaved in an I-P-B-I-P-B pattern. In other words, in the example illustrated in FIG. 8, frames 810-1 and 810-4 may be I-frames, frames 810-2 and 810-5 may be P-frames, and frames 810-3 and 810-6 may be B-frames.

Object data preparation unit 808 may receive raw object data 810 and prepare raw object data 810 in accordance with a data partitioning protocol (e.g., for concurrent transmission by way of parallel network interfaces 802) by partitioning raw object data 810 into a first data stream 812-1 and a second data stream 812-2 (e.g., referred to collectively as data streams 812). As shown, data stream 812-1 may then be transmitted as object data portion 804-1 by way of network interface 802-1 while data stream 812-2 may be transmitted as object data portion 804-2 by way of network interface 802-2.

More specifically, the data partitioning protocol in accordance with which object data preparation unit 808 prepares raw object data 810 may include (e.g., utilize, implement, etc.) one or more of the data partitioning schemes described herein. For example, as shown below communication device 800, the data partitioning protocol used by object data preparation unit 808 may include the third data partitioning scheme in which raw object data 810 is representative of at least one video image captured by at least one video capture unit (e.g., video capture unit 806), data stream 812-1 is representative of a first plurality of frames of the at least one video image and having one or more frame types included in a first set of one or more frame types (e.g., I-frames only, including frames 810-1 and 810-4), and data stream 812-2 is representative of a second plurality of frames of the at least one video image and having one or more frame types included in a second set of one or more frame types (e.g., P-frames and B-frames only, including frames 810-2, 810-3, 810-5, and 810-6). As shown, the one or more frame types included in the first set of one or more frame types (e.g., the set that includes I-frames only) may be different than the one or more frame types included in the second set of one or more frame types (e.g., the set that includes P-frames and B-frames only).

While only the third data partitioning scheme is illustrated in FIG. 8 for clarity of illustration, it will be understood that data partitioning protocols used by object data preparation unit 808 may additionally include additional data partitioning schemes (e.g., the first and/or second data partitioning schemes and/or other data partitioning schemes that may serve a particular implementation). Additionally, it will be understood that more than two data streams 812 may be used (e.g., along with more than two network interfaces 802, and more than two object data portions 804) to implement the second data partitioning scheme when more than two frame types are defined for raw object data 810. For example, I-frames, P-frames, and B-frames could each be assigned to a different data stream 812 in certain implementations.

In some examples, object data preparation 808 may prepare raw object data 810 in accordance with the data partitioning protocol (e.g., including the third data partitioning scheme) by dynamically monitoring the respective data transfer rates at which object data portions 804 are transmitted, and, in response to detecting a change in one of the data transfer rates based on the dynamic monitoring, dynamically changing data streams 812 as data streams 812 are being partitioned using the data partitioning protocol. For example, in response to a detection (i.e., based on the dynamic monitoring) that a data transfer rate associated with network interface 802-1 has increased and/or that a data transfer rate associated with network interface 802-2 has decreased (e.g., due to network conditions, etc.), object data preparation unit 808 may dynamically reapportion a frame type included among the second set of one or more frame types of the second plurality of frames represented by data stream 812-2 (e.g., P-frames) to be included among the first set of one or more frame types of the first plurality of frames represented by data stream 812-1.

To illustrate, FIG. 9 is nearly identical to FIG. 8 except that frames 810-2 and 810-5 (i.e., the P-frames of the predictive frame type) are included among the first set of one or more frame types of the first plurality of frames represented by data stream 812-1 rather than being included among the second set of one or more frame types of the second plurality of frames represented by data stream 812-2 (as was the case in FIG. 8). As a result, data stream 812-1 may be associated with more object data and data stream 812-2 may be associated with less object data as compared with partitioning of video images in FIG. 8. As with the dynamic changes described in relation to FIGS. 4-7, these dynamic changes to data streams 812 may similarly help ensure that the concurrent transmission of the object data over parallel network interfaces 802 is as fast and/or cost-efficient as possible for the same reasons described above.

In order for the object data to be combined after transmission, object data preparation unit 808 may further generate and/or append to at least one of data streams 812 some partitioning data 816. For example, as shown in FIGS. 8 and 9, partitioning data 816 may be appended to data stream 812-1 to be transmitted by way of network interface 802-1 along with object data portion 804-1. In other examples, partitioning data 816 may be appended to data stream 812-2 to be transmitted by way of network interface 802-2 along with object data portion 804-2, or to both data streams 812 to be transmitted by way of both network interfaces 802.

As with partitioning data 416 and 616 described above, partitioning data 816 may take any form as may serve a particular implementation, such as, for example, a file, metadata included within a packet header, or the like. Additionally, partitioning data 816 may similarly include data allowing the partitioning of raw object data 810 to be reversed (e.g., recombined back into the form of raw object data 810) and/or to be combined, stitched, and/or otherwise processed into a new form (e.g., into a renderable object data aggregation). As described above, for example, object data may be partitioned into chunks that are each labeled with metadata (e.g., partitioning data 816) indicative of an object with which each chunk is associated, a relationship of each chunk to one or more other chunks representative of the same object, etc.

Figure 10:
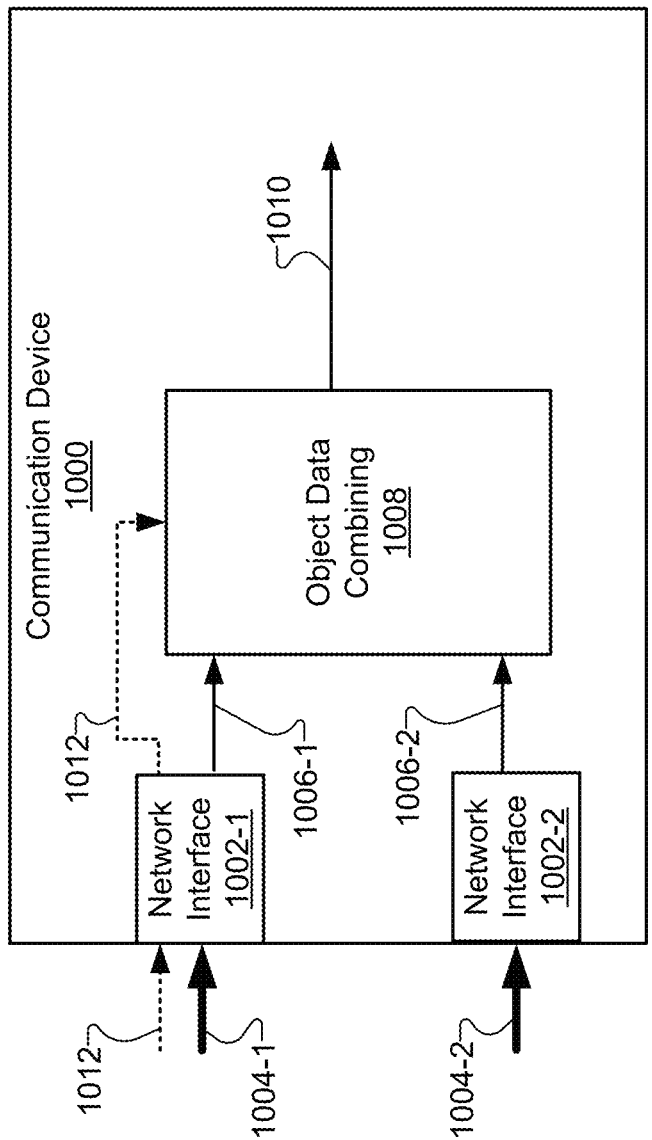
FIG. 10 illustrates an exemplary combination of a first and a second data stream concurrently transmitted by way of parallel network interfaces into a renderable object data aggregation according to principles described herein.

To illustrate how object data portions may be recombined and/or otherwise stitched together or processed into renderable object data aggregations, FIG. 10 shows an exemplary combination of a first data stream and a second data stream concurrently transmitted by way of parallel network interfaces into an exemplary renderable object data aggregation. More specifically, FIG. 10 illustrates a communication device 1000 having parallel network interfaces 1002 (e.g., network interfaces 1002-1 and 1002-2) receiving object data portions 1004 (e.g., object data portions 1004-1 and 1004-2). For example, object data portions 1004 may be transmitted (e.g., by way of one network interface or parallel network interfaces) by another communication device (e.g., any of the implementations of device 100 described above). Communication device 1000 may also implement device 100 and, as such, communication device 1000, network interfaces 1002, and object data portions 1004 may each be similar or identical to other communication devices, network interfaces, and/or transmitted or received data described herein (e.g., described above with respect to FIGS. 1-9).

As shown in FIG. 10, the receiving of object data portion 1004-1 may be performed by receiving a first data stream 1006-1 and the receiving of object data portion 1004-2 may be performed by receiving a second data stream 1006-2

(referred to collectively as data streams 1006). The combining of object data portion 1004-1 and object data portion 1004-2 may then be performed by an object data combining unit 1008 to generate a renderable object data aggregation 1010 by reversing the partitioning of the raw object data into the first and second data streams (e.g., the partitioning of raw object data 410, 610, and/or 810 into data streams 412, 612, and/or 812, respectively, as described above in relation to FIGS. 4, 6, and/or 8).

For example, object data combining unit 1008 may reverse the partitioning in accordance with at least one of the first data partitioning scheme (illustrated above in relation to FIGS. 4 and 5), the second data partitioning scheme (illustrated above in relation to FIGS. 6 and 7), and/or the third data partitioning scheme (illustrated above in relation to FIGS. 8 and 9). In certain implementations (e.g., implementations where the transmitting communication device dynamically monitors the data transfer rates and performs dynamic changes to the data streams based on detected changes to the data transfer rates), object data combining unit 1008 may also reverse (i.e., account for) dynamic changes to data streams 1006 (e.g., the dynamic changes described above with respect to FIGS. 5, 7, and 9). Specifically, object data combining unit 1008 may combine object data portion 1004-1 and object data portion 1004-2 into renderable video aggregation 1010 by reversing the partitioning of the raw object data into the first and second data streams in accordance with at least one of the first data partitioning scheme including the dynamically updated division within the integrated video image, the second data partitioning scheme including the dynamically reapportioned discrete video image, and the third data partitioning scheme including the dynamically reapportioned frame type.

In order to combine object data portion 1004-1 and object data portion 1004-2 into renderable object data aggregation 1010 (e.g., by reversing the partitioning performed in accordance with the data partitioning protocol prior to transmission of the object data, by performing additional stitching and/or other processing on the object data, etc.), communication device 1000 may receive partitioning data 1012. For example, partitioning data 1012 may be appended to the object data (e.g., to at least one of object data portions 1004) by the transmitting communication device and transmitted by way of at least one of network interfaces 1002. Partitioning data 1012 may be associated with the data partitioning protocol and, as such, may be indicative of a data combination scheme by which communication device 1000 is to combine object data portion 1004-1 (i.e., data stream 1006-1) and object data portion 1004-2 (i.e., data stream 1006-2) into renderable object data aggregation 1010.

In certain examples, the data combination scheme represented in partitioning data 1012 may simply include data related to the data partitioning protocol to allow the data partitioning to be reversed. For example, partitioning data 1012 may include data related to which data partitioning scheme or schemes were used in the partitioning, data related to a division within an integrated video image where a first section of the integrated video image is split off from a second section of the integrated video image (e.g., data related to division 414 of FIG. 4), data related to respective sets of video images and which discrete video images are included within the sets (e.g., data related to sets of video images shown in FIG. 6), data related to respective sets of frame types and which frame types are included within the sets (e.g., data related to sets of frame types shown in FIG. 8), and the like. If object data (e.g., non-video object data) has been partitioned into serialized chunks, partitioning data 1012 may include labels to identify an object with which each chunk is associated and/or to identify where each chunk belongs in a sequence of the chunks (e.g., using serialized identification numbers). As such, the data combination scheme may also involve extracting the labels from partitioning data 1012 and reconstructing an instance of object data by recombining the chunks of the instance of the object data according to the labels.

Additionally or alternatively, the data combination scheme represented in partitioning data 1012 may include additional data (e.g., metadata) related to the object data to facilitate stitching or other processing of the object data into renderable object data aggregation 1010 as may be appropriate for a particular application. For example, as will be described in more detail below, renderable object data aggregation 1010 may be virtual reality media content that is configured to be transmitted to one or more other devices (e.g., media player devices) configured to render the virtual reality media content to generate an immersive virtual reality world that may be experienced by users of the devices. As such, the object data in object data portions 1004 may be stitched together into, for example, a 360° image and/or may be otherwise processed to add other elements (e.g., virtual objects, volumetric modeling, etc.) to the virtual reality media content. To facilitate the stitching and other processing of the object data to create the renderable object data aggregation, additional data may also be included within partitioning data 1012 such as synchronization information (e.g., data usable to synchronize data captured by multiple video capture units), camera identification information (e.g., location, orientation, angle, and other information specific to each video capture unit), timing information, depth information for objects represented within the object data, and/or any other information as may serve a particular implementation.

A specific example will now be described to illustrate communication devices configured to transmit and receive object data by way of parallel network interfaces, combine the object data into a renderable object data aggregation that includes virtual reality media content, and transmit the virtual reality media content to one or more other devices for users to experience the virtual reality media content using the other devices.

Figure 11:
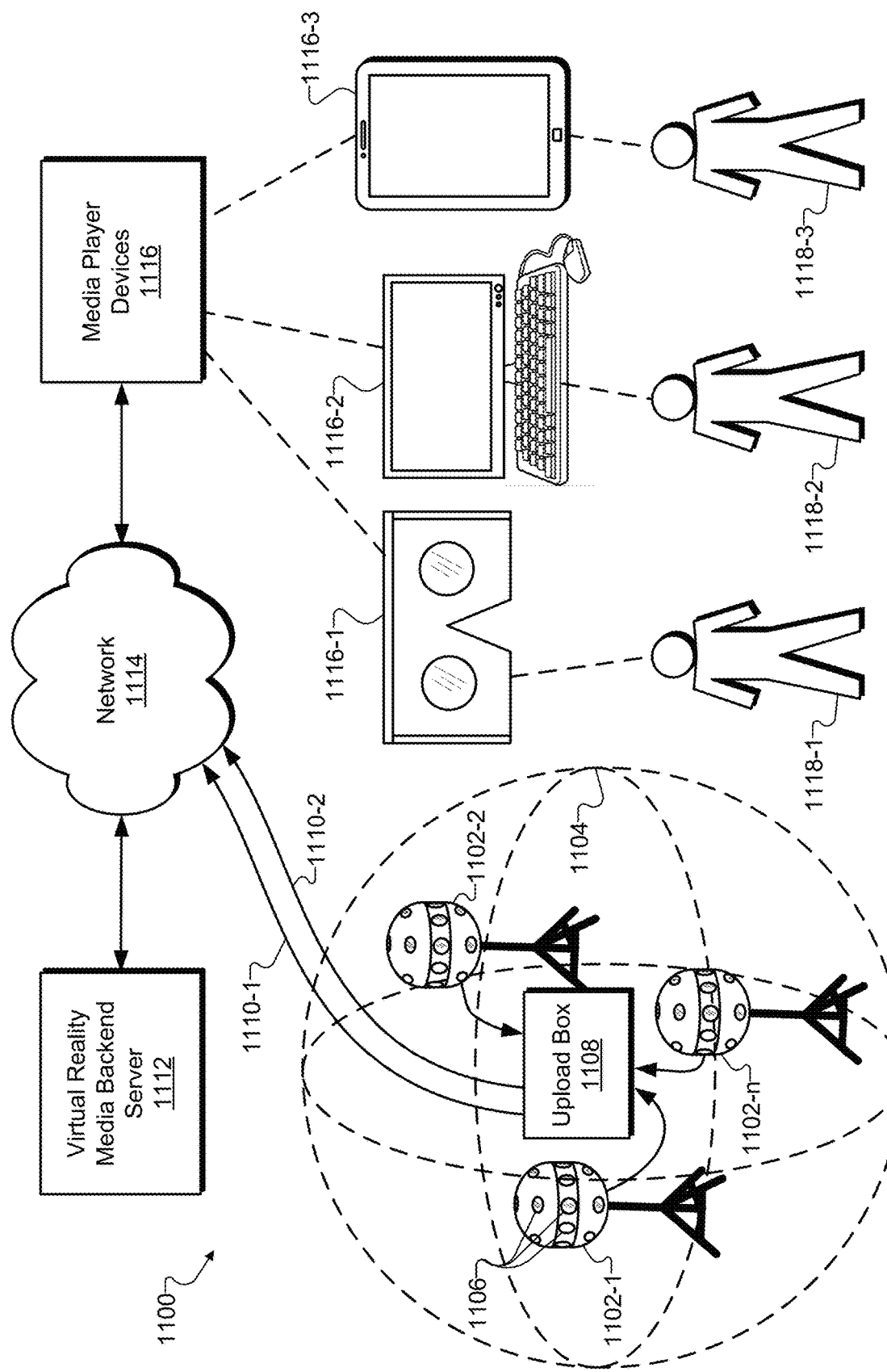
FIG. 11 illustrates an exemplary configuration in which exemplary implementations of communication devices concurrently transmit object data by way of parallel network interfaces in order to provide a virtual reality experience to one or more users according to principles described herein.

To this end, FIG. 11 illustrates an exemplary configuration 1100 in which exemplary implementations of communication devices concurrently transmit object data by way of parallel network interfaces in order to provide a virtual reality experience to one or more users. Specifically, in configuration 1100, exemplary embodiments of 360-degree cameras, an upload box, a virtual reality media backend server, and one or more media player devices operate to concurrently transmit and receive object data by way of parallel network interfaces, and then to distribute virtual reality media content.

As shown in FIG. 11, a plurality of 360-degree cameras 1102 (e.g., cameras 1102-1 through 1102-n) may capture and/or generate a 360-degree image of real-world scenery 1104 (e.g., real-world places such as city streets, buildings, landscapes, etc.; real-world events such as sporting events, large celebrations such as New Year's Eve, etc.; fictionalized live action entertainment such as virtual reality television shows, virtual reality movies, etc.; and so forth) around a center point corresponding to camera 1102. For example, each camera 1102 may capture a plurality of images from each of a plurality of segment capture cameras 1106 built into or otherwise associated with the camera 1102, and the 360-degree image of real-world scenery 1104 may be generated by combining the plurality of images captured by segment-capture cameras 1106 and/or by other cameras 1102, as described below.

Cameras 1102 may capture object data (e.g., video data, texture data, etc.) representative of 360-degree images of real-world scenery 1104 and transfer the object data to an upload box 1108. Upload box 1108 may be an implementation of device 100 and, as such, may include parallel network interfaces for transmitting the object data (e.g., the object data transferred from cameras 1102) as two object data portions 1110 (e.g., object data portions 1110-1 and 1110-2) to a virtual reality media backend server 1112 by way of a network 1114.

Media backend server 1112 may also be an implementation of device 100 and, as such, may be configured to receive the object data (e.g., using one or more network interfaces as illustrated by communication devices 204 and 304 in FIGS. 2 and 3, respectively). Upload box 1108 may also transmit, and media backend server 1112 may also receive, along with the object data, partition data associated with the data partitioning protocol that upload box 1108 uses to partition the object data and indicative of a data combination scheme by which media backend server 1112 is to combine object data portions 1110 into a renderable object data aggregation that includes virtual reality media content representative of an immersive virtual reality world. Accordingly, media backend server 1112 may identify the data partitioning protocol and combine (e.g., stitch, process, etc.) object data portions 1110 into the virtual reality media content in accordance with the partitioning data. Media backend server 1112 may then transmit (e.g., by way of network 1114) the virtual reality media content representative of the immersive virtual reality world to one or more media player devices 1116 such as a head-mounted virtual reality device 1116-1, a personal computer device 1116-2, a mobile device 1116-3, and/or to any other form factor of media player device as may serve a particular implementation. Regardless of what form factor media player devices 1116 take, users 1118 (e.g., users 1118-1 through 1118-3) may experience the immersive virtual reality world by way of media player devices 1116.

Figure 12:
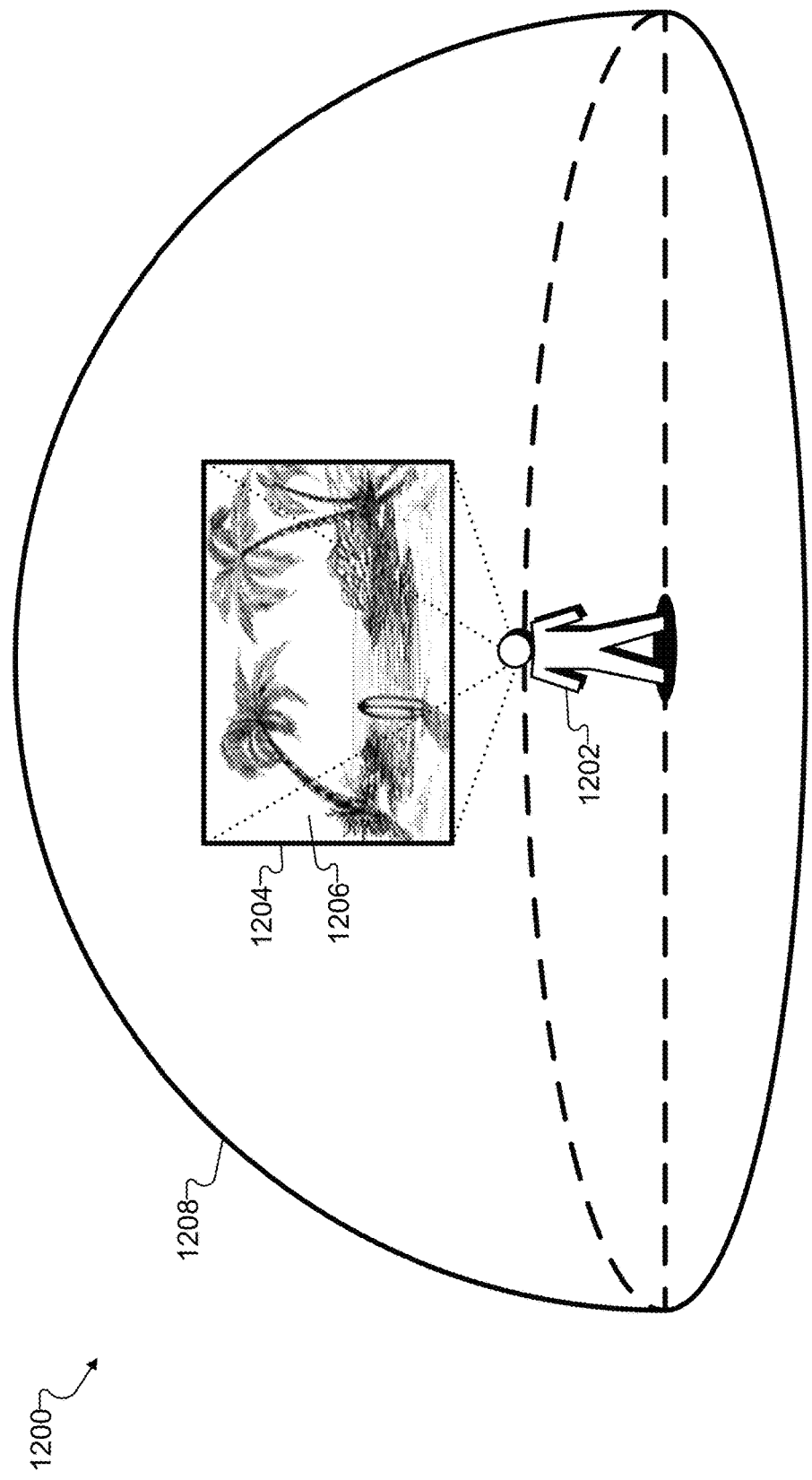
FIG. 12 illustrates an exemplary virtual reality experience in which a user is presented with an exemplary field of view that includes content of an exemplary immersive virtual reality world according to principles described herein.

To illustrate how the immersive virtual reality world may be experienced by users 1118, FIG. 12 shows an exemplary virtual reality experience 1200 in which a user 1202 is presented with an exemplary field of view 1204 that includes content 1206 of an exemplary immersive virtual reality world 1208. User 1202 may experience immersive virtual reality world 1208 ("world 208") by providing user input to dynamically change field of view 1204 to display whatever content within world 1208 that user 1202 wishes to view. For example, the user input provided by user 1202 may include an indication that user 1202 wishes to look at content not currently presented within field of view 1204 (i.e., content of world 1208 other than content 1206). For media player devices 1116 such as personal computer 1116-2 and/or mobile device 1116-3, this user input may include a mouse movement, navigation key input from a keyboard, a swipe gesture, or the like. For media player devices 1116 incorporating particular sensors (e.g., motion, directional, and/or orientation sensors) such as head-mounted virtual reality device 1116-1 and/or mobile device 1116-3, however, this user input may include a change to an orientation of the display screen of the media player device 1116 with respect to at least one axis of at least two orthogonal axes. As such, the media player device 1116 may be configured to detect the change to the orientation of the display screen as user 1202 experiences world 1208, and the dynamic changing of the content includes gradually replacing content 1206 with other content of world 1208 that is determined to be visible from a viewpoint of user 1202 within world 1208 according to the detected change to the orientation of the display screen with respect to the at least one axis.

To illustrate, FIG. 12 shows that content 1206 may include real-world scenery depicting a beach with palm trees and a surfboard. User 1202 may provide user input to a media player device by which user 1202 is experiencing world 1208 (e.g., one of media player devices 1116) to indicate that user 1202 wishes to look at content to the left of content 1206 currently included within field of view 1204. For example, user 1202 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 1204 to give user 1202 a sensation that he or she is turning to look to the left in world 1208. As content 1206 scrolls off the right side of field of view 1204, new content (not explicitly shown in FIG. 12) may smoothly scroll onto the left side of field of view 1204. In this way, user 1202 may provide user input to cause field of view 1204 to present any part of world 1208 that user 1202 desires.

It will be understood that world 1208 may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as mentioned above, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

Figure 13:
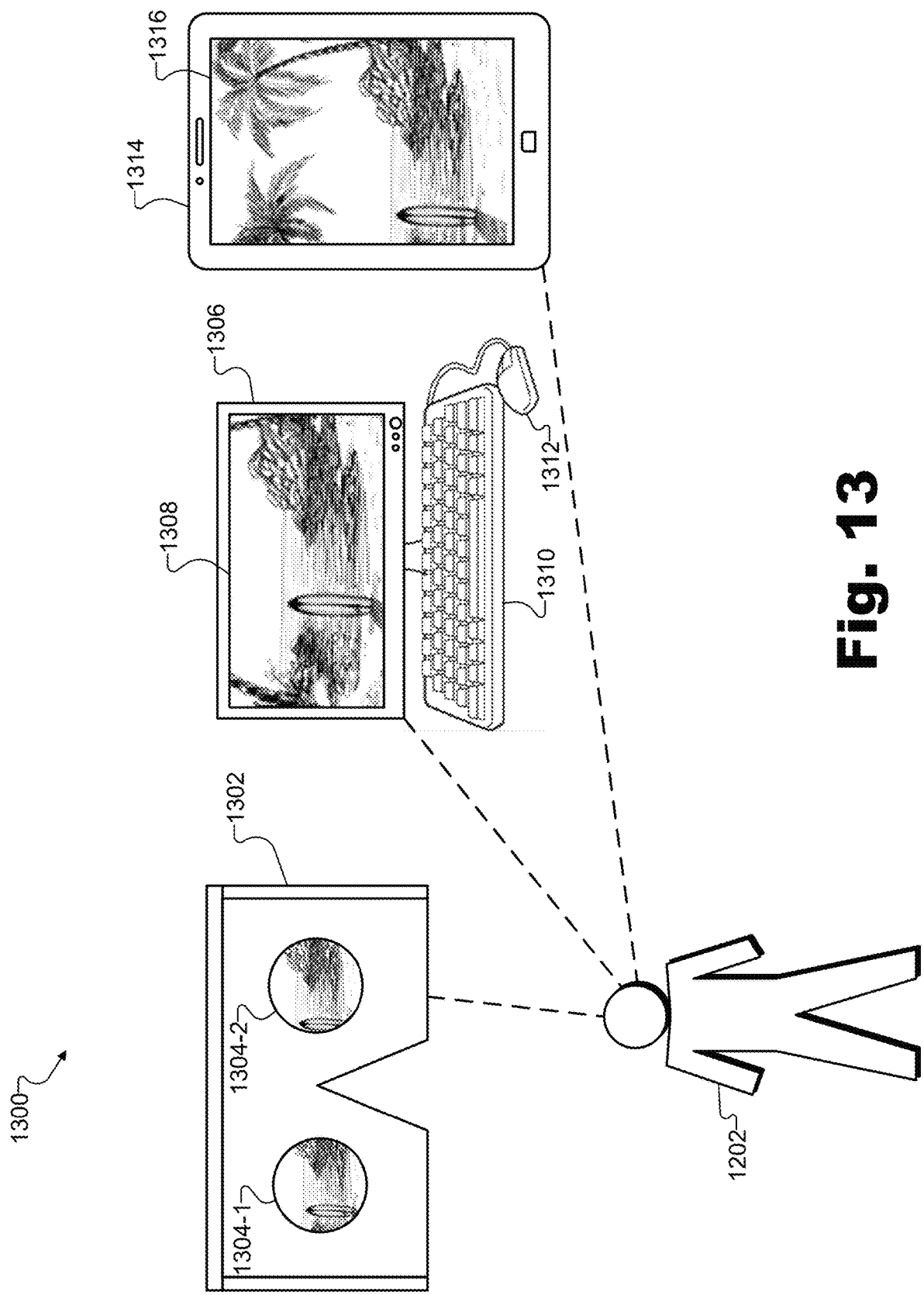
FIG. 13 illustrates exemplary media player devices configured to facilitate experiencing the immersive virtual reality world of FIG. 12 by the user according to principles described herein.

Different types of media player devices may provide different experiences for user 1202 by presenting field of view 1204 of world 1208 in different ways, by receiving user input from user 1202 in different ways, and so forth. To illustrate, FIG. 13 shows exemplary media player devices 1300 configured to facilitate experiencing of world 1208 by user 1202. Media player devices 1300 may correspond to media player devices 1116, described above in relation to FIG. 11.

As one example, a head-mounted virtual reality device 1302 may be mounted on the head of user 1202 and arranged so that each of the eyes of user 1202 sees a distinct display screen 1304 (e.g., display screens 1304-1 and 1304-2) within head-mounted virtual reality device 1302. In some examples, a single display screen 1304 may be presented and shared by both eyes of user 1202. In other examples, as shown, distinct display screens 1304 within head-mounted virtual reality device 1302 may be configured to display slightly different versions (i.e., stereoscopic versions) of field of view 1204 to give user 1202 the sense that world 1208 is three-dimensional. Display screens 1304 may also be configured to display content 1206 such that content 1206 fills the peripheral vision of user 1202, providing even more of a sense of realism to user 1202. Moreover, head-mounted virtual reality device 1302 may include motion sensors (e.g., accelerometers), directional sensors (e.g., magnetometers), orientation sensors (e.g., gyroscopes), and/or other suitable sensors to detect natural movements (e.g., head movements) of user 1202 as user 1202 experiences world 1208. Thus, user 1202 may provide input indicative of a desire to move field of view 1204 in a certain direction and by a certain amount in world 1208 by simply turning his or her head in that direction and by that amount. As such, head-mounted virtual reality device 1302 may provide user 1202 with a natural and hands-free experience that does not require any physical console control to experience the immersive virtual reality world and that may be the most immersive virtual reality experience provided by any type of media player device.

As another example of a media player device, a personal computer device 1306 having a display screen 1308 (e.g., a monitor) may be used by user 1202 to experience world 1208. Because display screen 1308 may not provide the distinct stereoscopic view for each of the user's eyes and/or may not fill the user's peripheral vision, personal computer device 1306 may not provide the same degree of immersiveness that head-mounted virtual reality device 1302 provides. However, personal computer device 1306 may be associated with other advantages such as its ubiquity among casual virtual reality users that may not be inclined to purchase or use a head-mounted virtual reality device. In some examples, personal computer device 1306 may allow a user to experience virtual reality content within a standard web browser so that user 1202 may conveniently experience world 1208 without using special devices or downloading special software. User 1202 may provide user input to personal computer device 1306 by way of a keyboard 1310 (e.g., using navigation keys on keyboard 1310 to move field of view 1204) and/or by way of a mouse 1312 (e.g., by moving mouse 1312 to move field of view 1204). In certain examples, a combination of keyboard 1310 and mouse 1312 may be used to provide user input such as by moving field of view 1204 by way of navigation keys on keyboard 1310 and clicking or otherwise interacting with objects within world 1208 by way of mouse 1312.

As yet another example of a media player device, a mobile device 1314 having a display screen 1316 may be used by user 1202 to experience world 1208. Mobile device 1314 may incorporate certain advantages of both head-mounted virtual reality devices and personal computer devices to provide the most versatile type of media player device for experiencing world 1208. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 1202 with an immersive experience comparable to that provided by head-mounted virtual reality devices. For example, mobile device 1314 may be configured to divide display screen 1316 into two versions (e.g., stereoscopic versions) of field of view 1204 and to present content 1206 to fill the peripheral vision of user 1202 when mobile device 1314 is mounted to the head of user 1202 using a relatively inexpensive and commercially-available mounting apparatus (e.g., a cardboard apparatus). In other embodiments, mobile device 1314 may facilitate experiencing world 1208 by receiving movement-based user input at arm's length (i.e., not mounted to the head of user 1202 but acting as a hand-held dynamic window for looking around world 1208), by receiving swipe gestures on a touchscreen, or by other techniques that may serve a particular embodiment.

Figure 14:
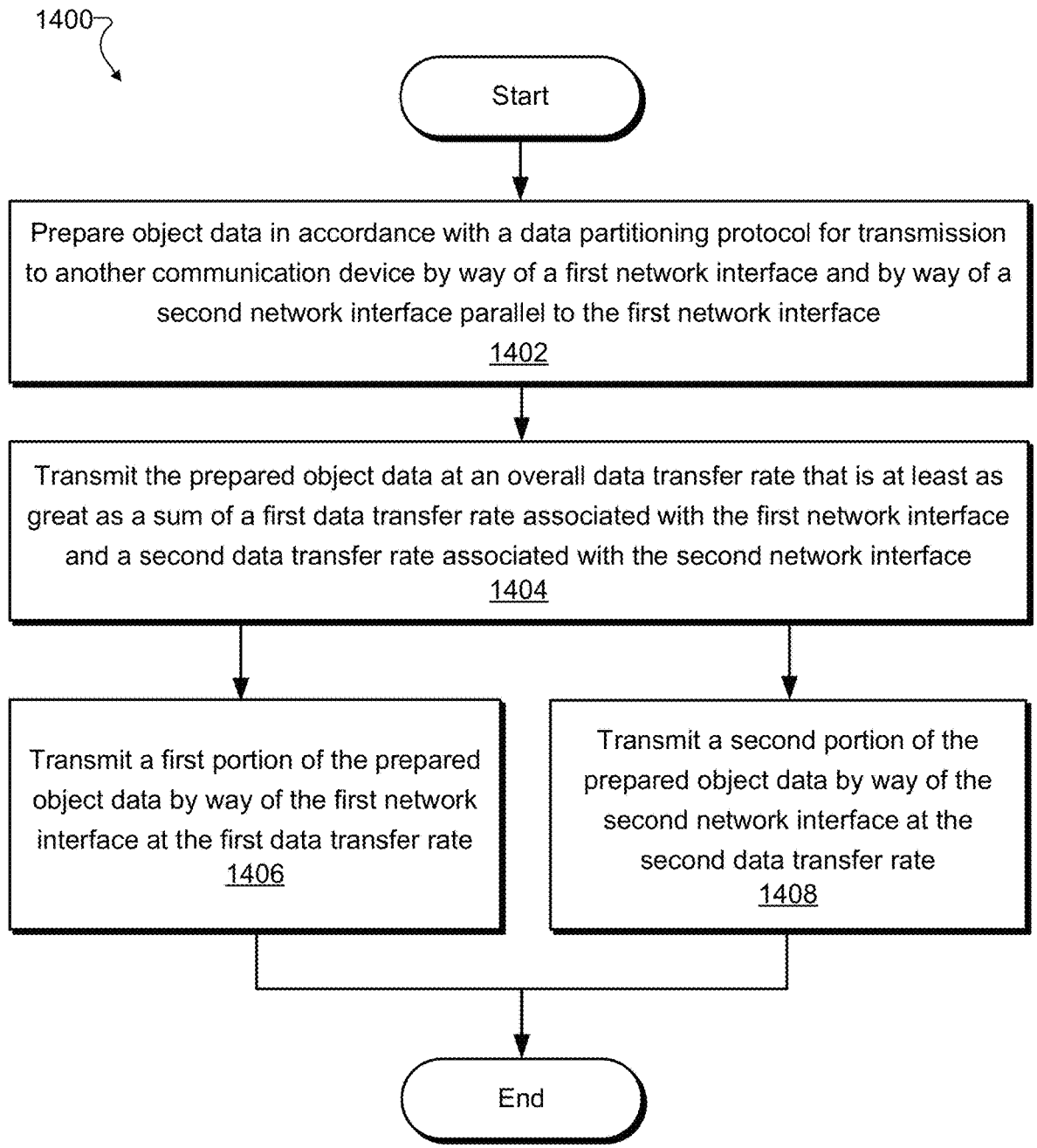
FIGS. 14-15 illustrate exemplary methods for concurrently transmitting object data by way of parallel network interfaces according to principles described herein.

FIG. 14 illustrates an exemplary method 1400 for concurrently transmitting object data by way of parallel network interfaces. While FIG. 14 illustrates exemplary operations according to one embodiment, other embodiments may omit, add to, reorder, and/or modify any of the operations shown in FIG. 14. One or more of the operations shown in FIG. 14 may be performed by device 100 and/or any implementation thereof, such as implementations of device 100 described herein.

In operation 1402, a first communication device communicatively coupled with a second communication device by way of a first network interface and by way of a second network interface parallel to the first network interface may prepare object data in accordance with a data partitioning protocol. For example, the first communication device may prepare the object data for transmission to the second communication device. Operation 1402 may be performed in any of the ways described herein.

In operation 1404, the first communication device may transmit the prepared object data to the second communication device at an overall data transfer rate that is at least as great as a sum of a first data transfer rate associated with the first network interface and a second data transfer rate associated with the second network interface. Operation 1404 may be performed in any of the ways described herein. For example, operation 1404 may be performed by concurrently performing operations 1406 and 1408 (illustrated side by side in FIG. 14 to illustrate that operations 1406 and 1408 may be performed concurrently as part of operation 1404).

In operation 1406, the first communication device may transmit a first portion of the prepared object data by way of the first network interface at the first data transfer rate. Operation 1406 may be performed in any of the ways described herein. For example, operation 1406 may be performed to help implement operation 1404 by being performed concurrently with operation 1408, described below.

In operation 1408, the first communication device may transmit a second portion of the prepared object data by way of the second network interface at the second data transfer rate. Operation 1408 may be performed in any of the ways described herein. For example, operation 1408 may be performed to help implement operation 1404 by being performed concurrently with operation 1406, described above.

Figure 15:
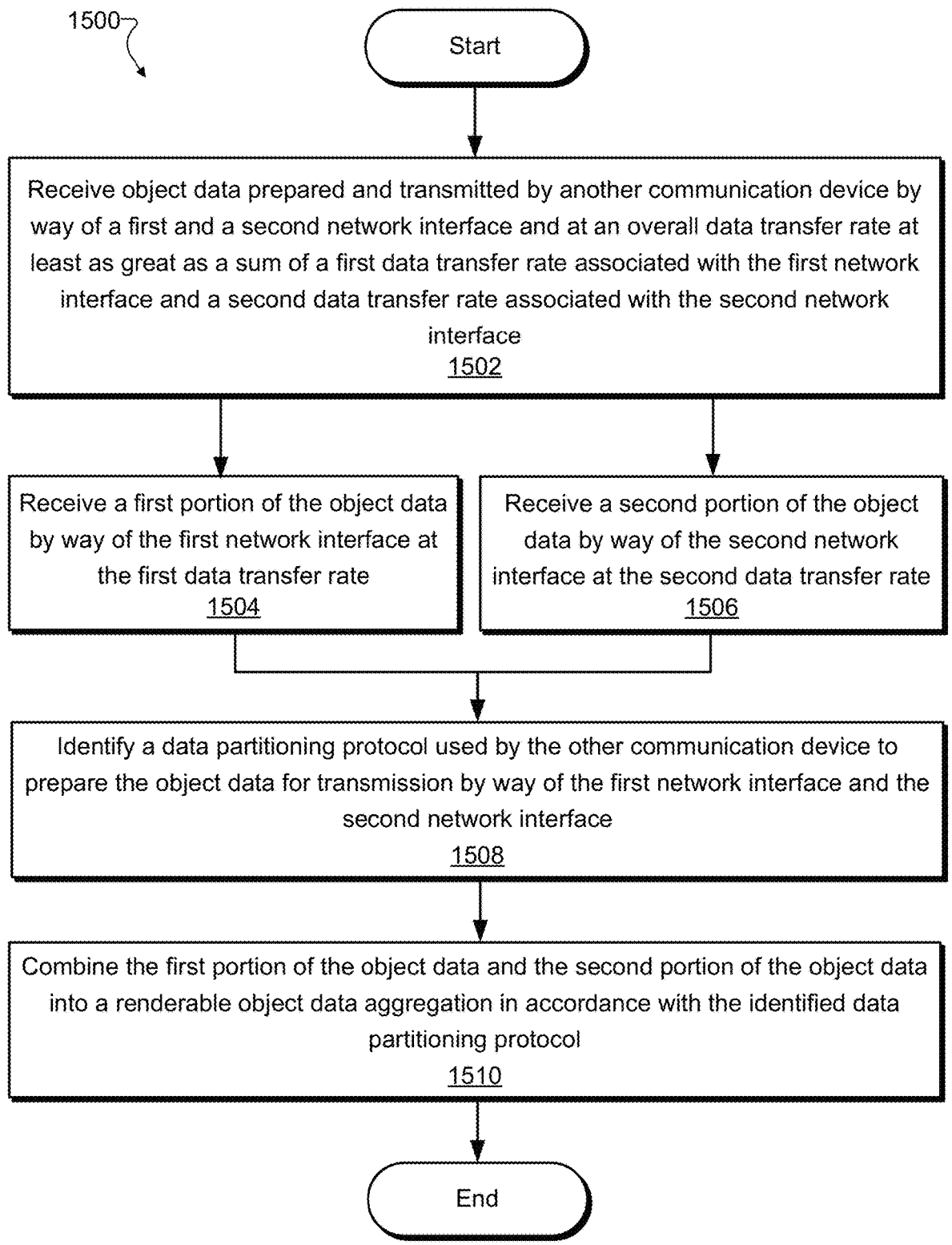

FIG. 15 illustrates an exemplary method 1500 for receiving concurrently transmitted object data by way of parallel network interfaces. While FIG. 15 illustrates exemplary operations according to one embodiment, other embodiments may omit, add to, reorder, and/or modify any of the operations shown in FIG. 15. One or more of the operations shown in FIG. 15 may be performed by device 100 and/or any implementation thereof, such as implementations of device 100 described herein.

In operation 1502, a second communication device communicatively coupled with a first communication device by a first network interface and by a second network interface parallel to the first network interface may receive object data prepared and transmitted to the second communication device by the first communication device. For example, the second communication device may receive the object data at an overall data transfer rate at least as great as a sum of a first data transfer rate associated with the first network interface and a second data transfer rate associated with the second network interface. Operation 1502 may be performed in any of the ways described herein. For example, operation 1502 may be performed by concurrently performing operations 1504 and 1506 (illustrated side by side in FIG. 15 to illustrate that operations 1504 and 1506 may be performed concurrently as part of operation 1502).

In operation 1504, the second communication device may receive a first portion of the object data by way of the first network interface at the first data transfer rate. Operation 1504 may be performed in any of the ways described herein. For example, operation 1504 may be performed to help implement operation 1502 by being performed concurrently with operation 1506, described below.

In operation 1506, the second communication device may receive a second portion of the object data by way of the second network interface at the second data transfer rate. Operation 1506 may be performed in any of the ways described herein. For example, operation 1506 may be performed to help implement operation 1502 by being performed concurrently with operation 1504, described above.

In operation 1508, the second communication device may identify a data partitioning protocol used by the first communication device to prepare the object data for transmission by way of the first network interface and the second network interface. Operation 1508 may be performed in any of the ways described herein.

In operation 1510, the second communication device may combine the first portion of the object data and the second portion of the object data into a renderable object data aggregation in accordance with the data partitioning protocol identified in operation 1508. Operation 1510 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 16:
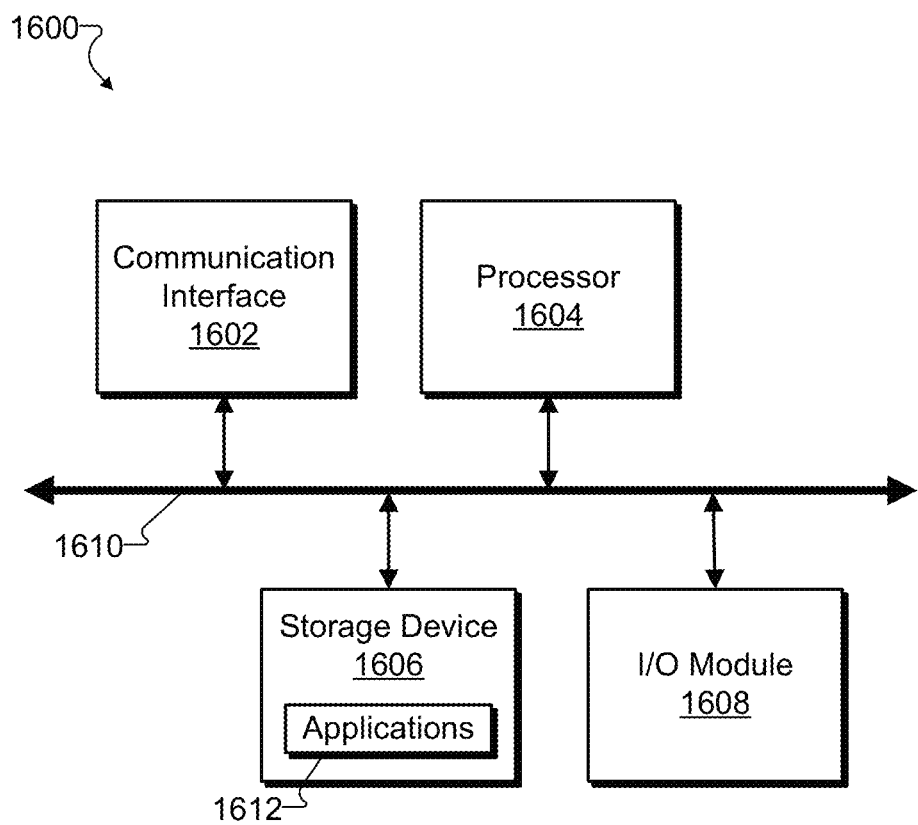
FIG. 16 illustrates an exemplary computing device according to principles described herein.

FIG. 16 illustrates an exemplary computing device 1600 that may be specifically configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1606. For example, data representative of one or more executable applications 1612 configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more processes or functions associated with data processing facility 102 or data communication facility 104 of device 100 (see FIG. 1). Likewise, storage facility 106 of device 100 may be implemented by or within storage device 1606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
preparing, by an upload box that is associated with a 360-degree camera including a plurality of segment capture cameras and that is communicatively coupled with a virtual reality media backend server by way of a first network interface and by way of a second network interface parallel to the first network interface, object data that includes discrete video images that are captured by each of the plurality of segment capture cameras and are collectively representative of a 360-degree image of real-world scenery, the preparing of the object data performed in accordance with a data partitioning protocol for transmission to the virtual reality media backend server by partitioning the object data into a first data stream and a second data stream by:
dynamically monitoring a first data transfer rate associated with the first network interface and a second data transfer rate associated with the second network interface,
detecting a change in at least one of the first and second data transfer rates based on the dynamic monitoring, and
dynamically changing, in response to the detecting of the change in the at least one of the first and second data transfer rates, which object data is partitioned into the first data stream and the second data stream by dynamically reapportioning, from the first data stream to the second data stream, a particular discrete video image captured by a particular segment capture camera; and
transmitting, by the upload box to the virtual reality media backend server, the prepared object data at an overall data transfer rate that is at least as great as a sum of the first data transfer rate and the second data transfer rate by:
transmitting the first data stream by way of the first network interface at the first data transfer rate, and
transmitting, concurrently with the transmission of the first data stream by way of the first network interface, the second data stream by way of the second network interface at the second data transfer rate.

2. The method of claim 1, wherein the first network interface and the second network interface are configured to each provide communicative access to a different network selected from a group of networks including at least:
a cellular data network;
a wireless local area network; and
a wired local area network.

3. The method of claim 1, wherein the preparing of the object data in accordance with the data partitioning protocol includes appending, to the prepared object data, partitioning data associated with the data partitioning protocol and indicative of a data combination scheme by which the virtual reality media backend server is to combine the first data stream and the second data stream into a renderable object data aggregation that includes virtual reality media content that is based on the real-world scenery and is to be provided to one or more media player devices configured to allow users to experience the virtual reality media content,
the method further comprising transmitting, by the upload box to the virtual reality media backend server along with the prepared object data and by way of at least one of the first network interface and the second network interface, the partitioning data appended to the prepared object data.

4. The method of claim 1, embodied as computer-executable instructions on at least one non-transitory computer-readable medium.

5. The method of claim 1, wherein the dynamically reapportioning of the particular discrete video image is performed based on a determination that the first network interface is associated with a network that is more costly to use than a network with which the second network interface is associated.

6. The method of claim 1, further comprising providing, by the upload box to the virtual reality media backend server prior to the transmitting of the prepared object data, a manifest file including partitioning data associated with the data partitioning protocol and indicative of a data combination scheme by which the virtual reality media backend server is to combine the first data stream and the second data stream into a renderable object data aggregation.

7. A method comprising:
receiving, by a virtual reality media backend server communicatively coupled by a first network interface and by a second network interface parallel to the first network interface with an upload box that is associated with a 360-degree camera including a plurality of segment capture cameras, object data that includes discrete video images that are captured by each of the plurality of segment capture cameras and are collectively representative of a 360-degree image of real-world scenery, the object data prepared and transmitted to the virtual reality media backend server by the upload box at an overall data transfer rate at least as great as a sum of a first data transfer rate associated with the first network interface and a second data transfer rate associated with the second network interface by:
   receiving a first data stream by way of the first network interface at the first data transfer rate, and
   receiving, concurrently with the receiving of the first data stream by way of the first network interface, a second data stream by way of the second network interface at the second data transfer rate;
identifying, by the virtual reality media backend server, a data partitioning protocol used by the upload box to prepare the object data for transmission by way of the first network interface and the second network interface by:
   dynamically monitoring the first data transfer rate associated with the first network interface and the second data transfer rate associated with the second network interface,
   detecting a change in at least one of the first and second data transfer rates based on the dynamic monitoring, and
   dynamically changing, in response to the detecting of the change in the at least one of the first and second data transfer rates, which object data is partitioned into the first data stream and the second data stream by dynamically reapportioning, from the first data stream to the second data stream, a particular discrete video image captured by a particular segment capture camera; and
combining, by the virtual reality media backend server in accordance with the identified data partitioning protocol, the first data stream and the second data stream into a renderable object data aggregation that includes virtual reality media content that is based on the real-world scenery and is to be provided to one or more media player devices configured to allow users to experience the virtual reality media content.

8. The method of claim 7, wherein the first network interface and the second network interface are configured to each provide communicative access to a different network selected from a group of networks including at least:
a cellular data network;
a wireless local area network; and
a wired local area network.

9. The method of claim 7, wherein:
the first and second data streams are prepared by the upload box in accordance with the data partitioning protocol by partitioning the object data into the first and second data streams prior to transmitting the first and second data streams to the virtual reality media backend server; and
the combining of the first data stream and the second data stream into the renderable video aggregation includes reversing the partitioning of the object data included within the first and second data streams based on the identified data partitioning protocol.

10. The method of claim 7, further comprising receiving, by the virtual reality media backend server from the upload box along with the object data and by way of at least one of the first network interface and the second network interface, partitioning data appended to the object data by the upload box and associated with the data partitioning protocol and indicative of a data combination scheme by which the virtual reality media backend server is to combine the first data stream and the second data stream into the renderable object data aggregation; and
   wherein the combining of the first data stream and the second data stream into the renderable object data aggregation is performed based on the data combination scheme indicated by the partitioning data.

11. The method of claim 7, embodied as computer-executable instructions on at least one non-transitory computer-readable medium.

12. The method of claim 7, further comprising receiving, by the virtual reality media backend server from the upload box prior to the receiving of the object data prepared and transmitted to the virtual reality media backend server by the upload box, a manifest file including partitioning data associated with the data partitioning protocol and indicative of a data combination scheme by which the virtual reality media backend server is to combine the first data stream and the second data stream into a renderable object data aggregation.

13. A first communication system comprising:
at least one physical computing device that
   prepares object data that includes discrete video images that are each captured by segment capture cameras of a plurality of segment capture cameras included within a 360-degree camera and that are collectively representative of a 360-degree image of real-world scenery, the preparing of the object data performed in accordance with a data partitioning protocol for transmission to a second communication system communicatively coupled with the first communication system by way of a first network interface and by way of a second network interface parallel to the first network interface, the preparation of the object data performed by partitioning the object data into a first data stream and a second data stream by:
      dynamically monitoring a first data transfer rate associated with the first network interface and a second data transfer rate associated with the second network interface,
      detecting a change in at least one of the first and second data transfer rates based on the dynamic monitoring, and
      dynamically changing, in response to the detecting of the change in the at least one of the first and second data transfer rates, which object data is partitioned into the first data stream and the second data stream by dynamically reapportioning, from the first data stream to the second data stream, a particular discrete video image captured by a particular segment capture camera; and
   transmits, to the second communication system, the prepared object data at an overall data transfer rate that is at least as great as a sum of the first data transfer rate and the second data transfer rate by:
      transmitting the first data stream by way of the first network interface at the first data transfer rate, and
      transmitting, concurrently with the transmission of the first data stream by way of the first network interface, the second data stream by way of the second network interface at the second data transfer rate.

14. The first communication system of claim 13, wherein the first network interface and the second network interface are configured to each provide communicative access to a different network selected from a group of networks including at least:
a cellular data network;
a wireless local area network; and
a wired local area network.

15. The first communication system of claim 13, wherein:
the at least one physical computing device prepares the object data in accordance with the data partitioning protocol by appending, to the prepared object data, partitioning data associated with the data partitioning protocol and indicative of a data combination scheme by which the second communication system is to combine the first data stream and the second data stream into a renderable object data aggregation that includes virtual reality media content that is based on the real-world scenery and is to be provided to one or more media player devices configured to allow users to experience the virtual reality media content; and
the at least one physical computing device further transmits, to the second communication system along with the prepared object data and by way of at least one of the first network interface and the second network interface, the partitioning data appended to the prepared object data.

16. The first communication system of claim 13, wherein the at least one physical computing device performs the dynamic reapportioning of the particular discrete video image based on a determination that the first network interface is associated with a network that is more costly to use than a network with which the second network interface is associated.

17. A second communication system comprising:
at least one physical computing device that
receives object data that includes discrete video images that are each captured by segment capture cameras of a plurality of segment capture cameras included within a 360-degree camera and that are collectively representative of a 360-degree image of real-world scenery, the object data prepared and transmitted to the second communication system by a first communication system communicatively coupled with the second communication system by a first network interface and by a second network interface parallel to the first network interface, the object data received at an overall data transfer rate at least as great as a sum of a first data transfer rate associated with the first network interface and a second data transfer rate associated with the second network interface and received by:
receiving a first data stream by way of the first network interface at the first data transfer rate, and
receiving, concurrently with the receiving of the first data stream by way of the first network interface, a second data stream by way of the second network interface at the second data transfer rate;
identifies a data partitioning protocol used by the first communication system to prepare the object data for transmission by way of the first network interface and the second network interface by:
dynamically monitoring the first data transfer rate associated with the first network interface and the second data transfer rate associated with the second network interface,
detecting a change in at least one of the first and second data transfer rates based on the dynamic monitoring, and
dynamically changing, in response to the detecting of the change in the at least one of the first and second data transfer rates, which object data is partitioned into the first data stream and the second data stream by dynamically reapportioning, from the first data stream to the second data stream, a particular discrete video image captured by a particular segment capture camera; and
combines, in accordance with the identified data partitioning protocol, the first data stream and the second data stream into a renderable object data aggregation that includes virtual reality media content that is based on the real-world scenery and is to be provided to one or more media player devices configured to allow users to experience the virtual reality media content.

18. The second communication system of claim 17, wherein the first network interface and the second network interface are configured to each provide communicative access to a different network selected from a group of networks including at least:
a cellular data network;
a wireless local area network; and
a wired local area network.

19. The second communication system of claim 17, wherein:
the first and second data streams are prepared by the first communication system in accordance with the data partitioning protocol by partitioning the object data into the first and second data streams prior to transmitting the first and second data streams to the second communication system; and
the at least one physical computing device combines the first data stream and the second data stream into the renderable video aggregation by reversing the partitioning of the object data included within the first and second data streams based on the identified data partitioning protocol.

20. The second communication system of claim 17, wherein:
the at least one physical computing device further receives, from the first communication system along with the object data and by way of at least one of the first network interface and the second network interface, partitioning data appended to the object data by the first communication system and associated with the data partitioning protocol and indicative of a data combination scheme by which the second communication system is to combine the first data stream and the second data stream into the renderable object data aggregation; and
the at least one physical computing device combines the first data stream and the second data stream into the renderable object data aggregation based on the data combination scheme indicated by the partitioning data.

* * * * *